(12) United States Patent
Bang et al.

(10) Patent No.: US 11,928,281 B2
(45) Date of Patent: Mar. 12, 2024

(54) ELECTRONIC DEVICE

(71) Applicant: SAMSUNG DISPLAY CO., LTD., Yongin-si (KR)

(72) Inventors: Gyeongnam Bang, Seoul (KR); Deokjung Kim, Busan (KR); Eunyoung Kim, Anyang-si (KR); Hyeyun Han, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/306,216

(22) Filed: Apr. 24, 2023

(65) Prior Publication Data

US 2023/0259232 A1  Aug. 17, 2023

Related U.S. Application Data

(63) Continuation of application No. 17/351,981, filed on Jun. 18, 2021, now Pat. No. 11,635,843.

(30) Foreign Application Priority Data

Jun. 24, 2020  (KR) .................. 10-2020-0077314

(51) Int. Cl.
*G06F 3/041* (2006.01)
*G06F 3/044* (2006.01)
*H04W 88/02* (2009.01)

(52) U.S. Cl.
CPC ........ *G06F 3/04164* (2019.05); *G06F 3/0443* (2019.05); *G06F 3/0446* (2019.05); *G06F 2203/04111* (2013.01); *H04W 88/02* (2013.01)

(58) Field of Classification Search
CPC .. G06F 3/04164; G06F 3/0446; G06F 3/0443; G06F 2203/04111; H04W 88/02

(Continued)

(56) References Cited

U.S. PATENT DOCUMENTS

| | | |
|---|---|---|
| 8,947,370 B2 | 2/2015 | An et al. |
| 10,331,237 B2 | 6/2019 | Nakamura |

(Continued)

FOREIGN PATENT DOCUMENTS

| | | |
|---|---|---|
| CN | 103246409 A | 8/2013 |
| KR | 10-1726623 B1 | 4/2017 |

OTHER PUBLICATIONS

EPO Extended European Search Report dated Oct. 12, 2021, issued in corresponding European Patent Application No. 21171220.3 (11 pages).

*Primary Examiner* — Mark Edwards
(74) *Attorney, Agent, or Firm* — Lewis Roca Rothgerber Christie LLP

(57) ABSTRACT

An electronic device, includes: a sensor layer having an active region and a peripheral region adjacent to the active region, the sensor layer including a plurality of sensing units on the active region and a plurality of wiring lines on the peripheral region, wherein each of the plurality of sensing units includes a plurality of sub-sensing units, wherein each of the plurality of sub-sensing units includes: a first portion extending in a first direction; a plurality of second portions protruding from the first portion; a plurality of cross patterns spaced apart from each other across the first portion; and a bridge pattern insulated from the first portion and electrically connected to the plurality of cross patterns, the bridge pattern intersecting the first portion, wherein the plurality of wiring lines include a first wiring line and a second wiring line that are electrically connected to the plurality of sub-sensing units.

17 Claims, 21 Drawing Sheets

(58) Field of Classification Search
USPC .......................................................... 345/173
See application file for complete search history.

(56) References Cited

U.S. PATENT DOCUMENTS

| | | | |
|---|---|---|---|
| 2013/0155000 A1* | 6/2013 | Trend | G06F 3/0443 |
| | | | 345/174 |
| 2013/0265244 A1* | 10/2013 | Kim | G06F 3/0448 |
| | | | 345/173 |
| 2015/0268761 A1 | 9/2015 | Yang | |
| 2017/0193275 A1 | 7/2017 | Liu | |
| 2019/0064960 A1* | 2/2019 | Na | G06F 3/0412 |
| 2020/0183518 A1 | 6/2020 | Na et al. | |
| 2021/0096693 A1* | 4/2021 | Ye | G06F 3/0445 |

\* cited by examiner

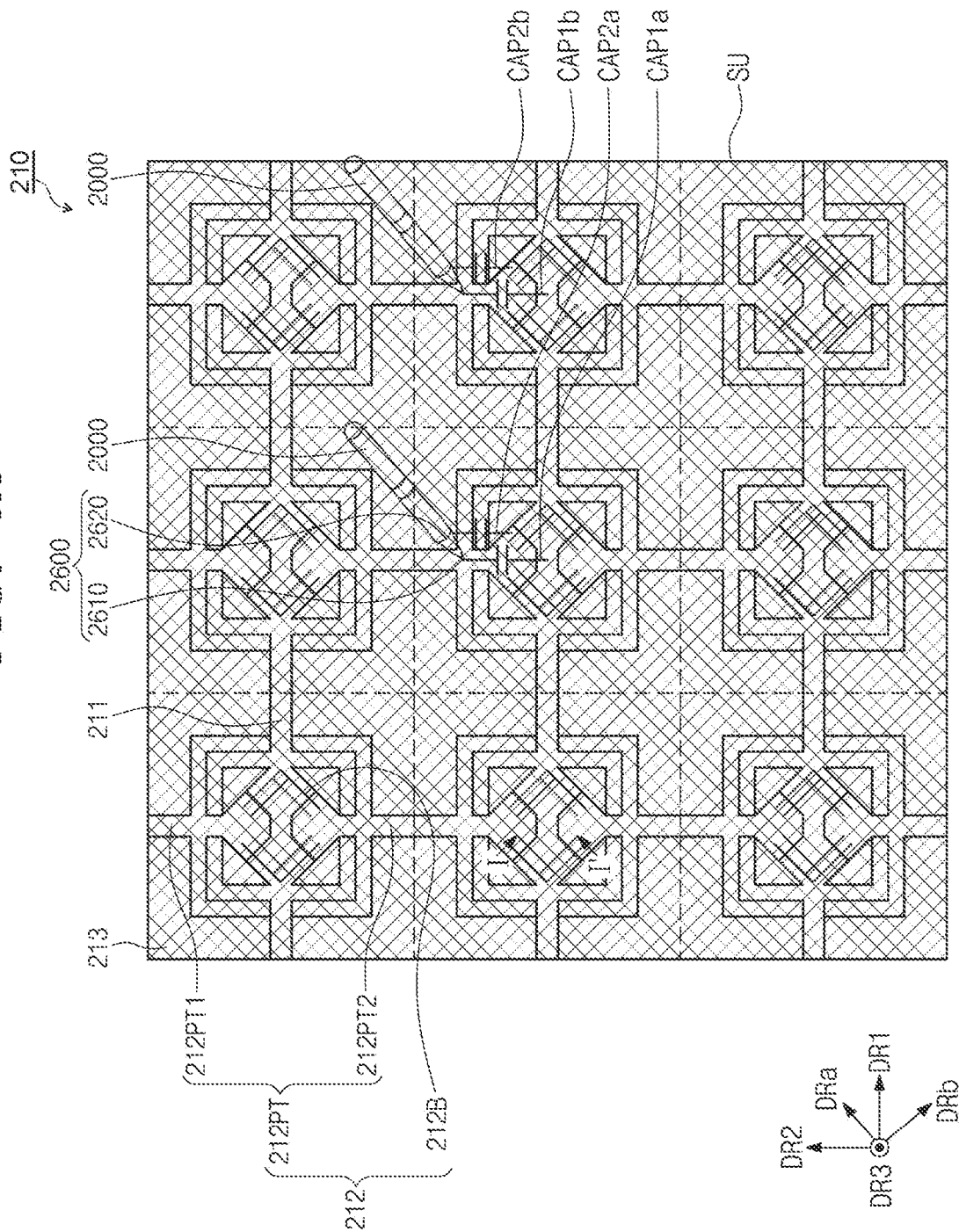

< Mode 1 >

< Mode 2 >

< Mode 2 >

< Mode 1 >

ELECTRONIC DEVICE

CROSS-REFERENCE TO RELATED APPLICATIONS

This application is a continuation of U.S. patent application Ser. No. 17/351,981, filed Jun. 18, 2021, which claims priority to and the benefit of Korean Patent Application No. 10-2020-0077314, filed Jun. 24, 2020, the entire content of both of which is incorporated herein by reference.

BACKGROUND

Aspects of some embodiments of the present invention relate to an electronic device with increased reliability of detection.

An electronic device may detect an external input that is externally applied from outside the electronic device. The external input may be a user's input. The user's input may include a user's body part, light, heat, pen, pressure, or various types of external inputs. The electronic device may use electromagnetic resonance (EMR) or active electrostatic (AES) to recognize coordinate information of a pen.

The above information disclosed in this Background section is only for enhancement of understanding of the background and therefore the information discussed in this Background section does not necessarily constitute prior art.

SUMMARY

Aspects of some embodiments of the present invention include an electronic device with increased reliability of detection.

According to some embodiments of the present inventive concepts, an electronic device may comprise: a display layer; and a sensor layer on the display layer and on which are defined an active region and a peripheral region adjacent to the active region. The sensor layer may include a plurality of sensing units on the active region and a plurality of wiring lines on the peripheral region. Each of the plurality of sensing units may include a plurality of sub-sensing units. Each of the plurality of sub-sensing units may include: a first portion that extends in a first direction; a plurality of second portions that protrude from the first portion; a plurality of cross patterns that are spaced apart from each other across the first portion; and a bridge pattern insulated from the first portion and electrically connected to the plurality of cross patterns, the bridge pattern intersecting the first portion. The plurality of wiring lines may include a first wiring line and a second wiring line that are electrically connected to the plurality of sub-sensing units.

In some embodiments, each of the plurality of cross patterns may include: a first cross portion that extends in a second direction intersecting the first direction; and a plurality of second cross portions that protrude from the first cross portion and adjoin the plurality of second portions.

In some embodiments, the plurality of second portions may include: a plurality of first pattern portions that protrude in the second direction from the first portion; a plurality of second pattern portions that correspondingly protrude from the plurality of first pattern portions in a direction adjacent to the first cross portion; and a plurality of third pattern portions that protrude in a first cross direction intersecting the first and second directions.

In some embodiments, the plurality of second cross portions may include: a plurality first cross pattern portions that correspondingly surround the plurality of first pattern portions and the plurality of second pattern portions; and a plurality of second cross pattern portions that correspondingly protrude in a direction facing the plurality of third pattern portions.

In some embodiments, each of the plurality of sub-sensing units may further include a plurality of dummy parts that are correspondingly located between the plurality of first pattern portions, the plurality of second pattern portions, the plurality of third pattern portions, and the plurality of second cross pattern portions.

In some embodiments, the plurality of second cross portions may include: a plurality of first cross pattern portions that protrude in the first direction from the first cross portion; and a plurality of second cross pattern portions that correspondingly protrude from the plurality of first cross pattern portions in a direction adjacent to the first portion.

In some embodiments, the plurality of second portions may include: a plurality of first pattern portions that correspondingly surround the plurality of first cross pattern portions and the plurality of second cross pattern portions; and a plurality of second pattern portions that are correspondingly spaced apart from the plurality of first pattern portions across the plurality of first cross pattern portions and the plurality of second cross pattern portions.

In some embodiments, the plurality of second portions may include: a plurality of first pattern portions that protrude from the first portion in a first cross direction intersecting the first and second directions; and a plurality of second pattern portions that protrude from the first portion in a second cross direction intersecting the first cross direction.

In some embodiments, the plurality of second cross portions may surround the plurality of second portions.

In some embodiments, the plurality of sub-sensing units may further include a plurality of dummy parts that are correspondingly located between the plurality of second cross portions and the plurality of second portions.

In some embodiments, the plurality of second cross portions may include: a plurality of first cross pattern portions that adjoin the plurality of first pattern portions and protrude in the first cross direction from the first cross portion; and a plurality of second cross pattern portions that adjoin the plurality of second pattern portions and protrude in the second cross direction from the first cross portion.

In some embodiments, each of the plurality of sub-sensing units may include: a plurality of first dummy portions that are correspondingly located between the plurality of first pattern portions and the plurality of first cross pattern portions; and a plurality of second dummy portions that are correspondingly located between the plurality of second pattern portions and the plurality of second cross pattern portions.

In some embodiments, the plurality of second portions may protrude in the second direction from the first portion. The plurality of second cross portions may protrude in the first direction from the first cross portion.

In some embodiments, each of the plurality of sensing units may be defined with a first region, a plurality of second regions adjacent in the first direction to the first region, and a plurality of third regions adjacent in a second direction to the first region, the second direction intersecting the first direction. The first region may be provided with the first portion, the plurality of second portions, the plurality of cross patterns, and the bridge pattern. Each of the plurality of second regions may be provided with the first portion and the plurality of second portions. Each of the plurality of third regions may be provided with the plurality of cross patterns.

In some embodiments, each of the plurality of sub-sensing units may further include a dummy electrode. Each of the plurality of sub-sensing units may be defined with a first region and a second region that surrounds the first region. The first region may be provided with the first portion, the plurality of second portions, the plurality of cross patterns, the bridge pattern, and the dummy electrode. The second region may be provided with the first portion, the first cross portion, and the dummy electrode.

In some embodiments, each of the plurality of wiring lines may be connected to the sub-sensing units adjacent to the peripheral region.

In some embodiments, each of the plurality of wiring lines may be connected to one of the sub-sensing units adjacent to the peripheral region. The sensor layer may further include a plurality of connection patterns that connect the plurality of sub-sensing units to each other.

In some embodiments, the first wiring line may be electrically connected to the first portion and the plurality of second portions. The second wiring line may be electrically connected to the plurality of cross patterns and the bridge pattern.

According to some embodiments of the present inventive concepts, an electronic device may include: a display layer; and a sensor layer which is on the display layer and on which are defined an active region and a peripheral region adjacent to the active region. The sensor layer may include a first electrode and a second electrode that extend in a first direction, a third electrode that extends in a second direction intersecting the first direction, and a plurality of wiring lines. The first electrode, the second electrode, and the third electrode may be on the active region. The plurality of wiring lines may be on the peripheral region. The first electrode may include: a first electrode portion that extends in the first direction; and a plurality of first protrusions that protrude from the first electrode portion. The second electrode may include: a second electrode portion that extends in the first direction; and a plurality of second protrusions that protrude from the second electrode portion. The third electrode may include: a third electrode portion that extends in the second direction; and a plurality of third protrusions that correspondingly surround the plurality of first protrusions and the plurality of second protrusions. The plurality of wiring lines may include: a first wiring line that is electrically connected to the first electrode and the second electrode; and a second wiring line that is electrically connected to the third electrode.

In some embodiments, the sensor layer may further include a plurality of bridge patterns that are electrically connected to opposite ends of the third electrode.

BRIEF DESCRIPTION OF THE DRAWINGS

FIG. 5A illustrates a plan view showing one of a plurality of sensing units according to some embodiments of the present invention.

DETAILED DESCRIPTION

Figure 1:
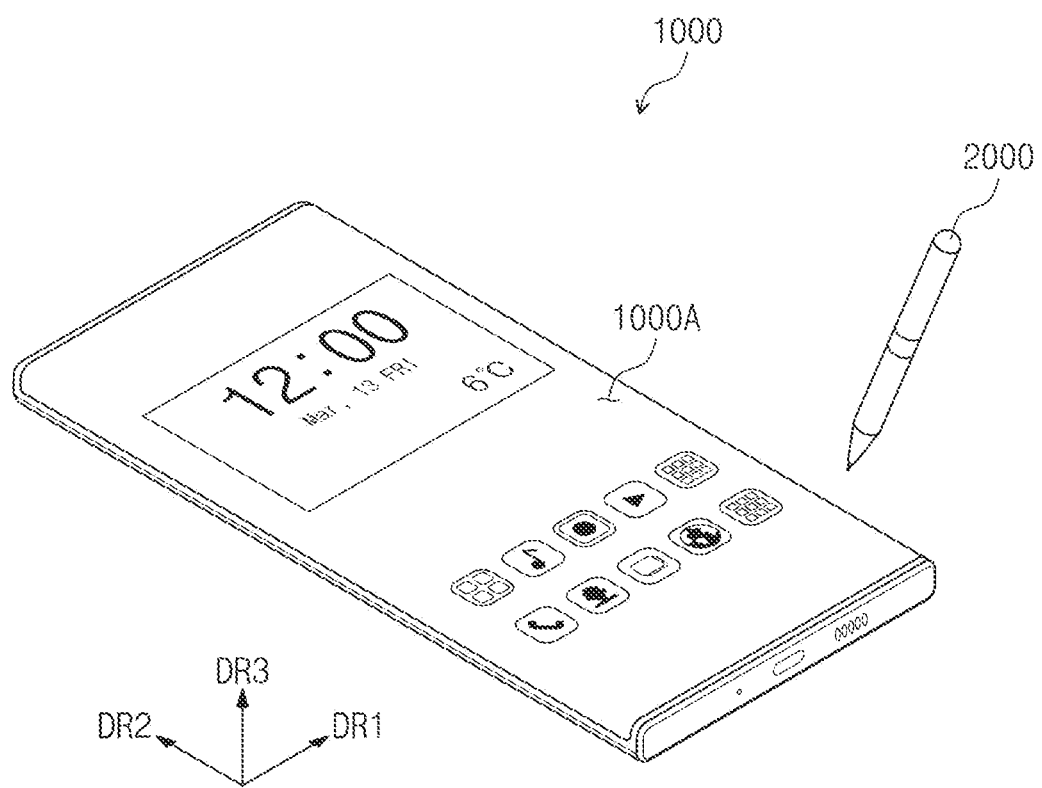
FIG. 1 illustrates a perspective view showing an electronic device according to some embodiments of the present invention.

In this description, when a certain component (or region, layer, portion, etc.) is referred to as being "on", "connected to", or "coupled to" other component(s), the certain component may be directly arranged or located on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents.

The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the present inventive concept. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

The following will now describe aspects of some embodiments of the present invention in conjunction with the accompanying drawings.

FIG. 1 illustrates a perspective view showing an electronic device according to some embodiments of the present invention.

Referring to FIG. 1, an electronic device 1000 may be an apparatus that is activated with an electronic signal. For example, the electronic device 1000 may be a mobile phone, a tablet computer, an automotive navigation system, a game console, or a wearable device, but embodiments according to the present invention are not limited thereto. FIG. 1 depicts a mobile phone as an example of the electronic device 1000.

The electronic device 1000 may display images at an active region 1000A. The active region 1000A may include a plane defined by a first direction DR1 and a second direction DR2. A thickness direction of the electronic device 1000 may be parallel to a third direction DR3 that intersects the first direction DR1 and the second direction DR2 (e.g., in a direction perpendicular or normal with respect to a plane defined by the first direction DR1 and the second direction DR2). The third direction DR3 may be used as a reference to define front and rear surfaces (or top and bottom surfaces) of each of members that constitute the electronic device 1000.

The electronic device 1000 may detect inputs that are externally applied from outside the electronic device 1000. The external inputs may be user's inputs. The user's input may include a user's body (e.g., a finger), light, heat, pressure, or various types of external inputs.

The electronic device 1000 shown in FIG. 1 may detect inputs from a user's touch or an input device 2000. The input device 2000 may indicate an apparatus other than a user's body. For example, the input device 2000 may be an active pen, a stylus pen, a touch pen, or an electronic pen. The following will describe an example in which an active pen is adopted as the input device 2000.

The electronic device 1000 and the input device 2000 may each perform two-way communication. The electronic device 1000 may provide the input device 2000 with uplink signals. For example, the unlink signals may include either synchronization signals or information about the electronic device 1000, but embodiments according to the present invention are not particularly limited thereto. The input device 2000 may provide the electronic device 1000 with downlink signals. The downlink signals may include either synchronization signals or information about states of the input device 2000. For example, the downlink signals may include coordinate information of the input device 2000, battery information of the input device 2000, slope information of the input device 2000, and/or various information stored in the input device 2000, but embodiments according to the present invention are not particularly limited thereto.

Figure 2:
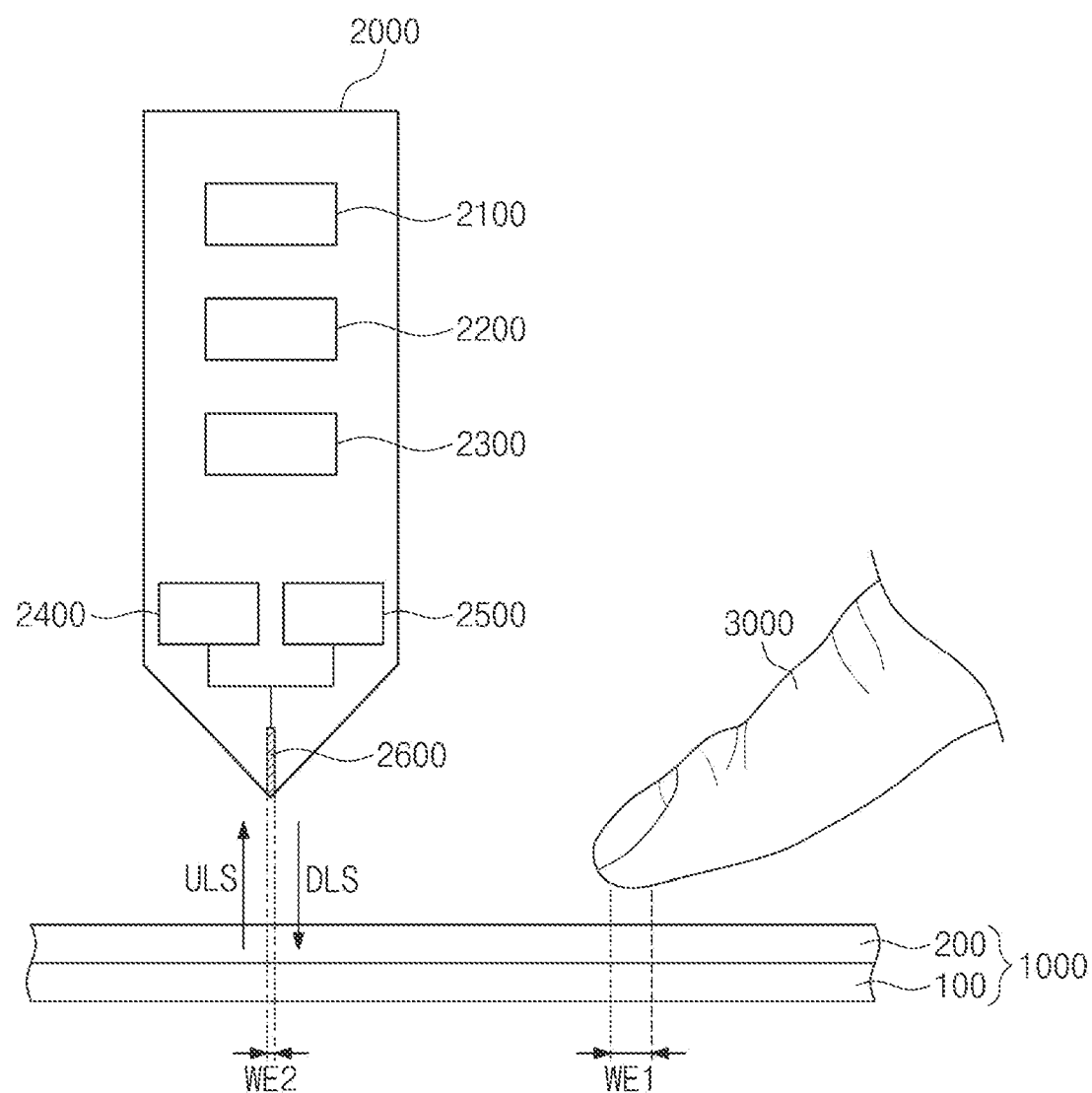
FIG. 2 illustrates a simplified block diagram showing an input device and an electronic device according to some embodiments of the present invention.

FIG. 2 illustrates a simplified block diagram showing an input device and an electronic device according to some embodiments of the present invention.

Referring to FIG. 2, the electronic device 1000 may include a display layer 100 and a sensor layer 200.

The display layer 100 may be a component to substantially generate images. The display layer 100 may be an emissive display layer, for example, an organic light emitting display layer, a quantum-dot display layer, a micro-led display layer, or a nano-led display layer. Embodiments according to the present disclosure are not limited thereto, however, and the display layer 100 may be any suitable emissive display layer according to the design of the electronic device 1000.

The sensor layer 200 may be located on the display layer 100. The sensor layer 200 may detect external inputs applied from outside. The sensor layer 200 may detect not only inputs from a user's body 3000, but also inputs from the input device 2000.

The user's body 3000 may have an input region of a first width WE1.

The sensor layer 200 may operate in time-division driving method. For example, the sensor layer 200 may be alternately and repeatedly driven under a first mode and a second mode. An input from the user's body 3000 may be detected in the first mode, and an input from the input device 2000 may be detected in the second mode.

When the second mode begins, the sensor layer 200 may provide the input device 2000 with an uplink signal ULS. When the input device 2000 receives the uplink signal ULS and is synchronized with the electronic device 1000, the input device 2000 may provide the sensor layer 200 with a downlink signal DLS.

The input device 2000 may include a power source 2100, a memory 2200, a controller 2300, a transmitter 2400, a receiver 2500, and a pen electrode 2600. However, components of the input device 2000 are not limited to those mentioned above. For example, the input device 2000 may further include an electrode switch to switch the pen electrode 2600 into a signal transmission mode or a signal reception mode, a pressure sensor to detect pressure, or a rotation sensor to detect rotation.

The pen electrode 2600 may include a first pen electrode (see, e.g., element 2610 of FIG. 5A) and a second pen electrode (see, e.g., element 2620 of FIG. 5A). The first pen electrode 2610 may be located at an end of the input device 2000. The second pen electrode 2620 may be located at a lateral surface of the input device 2000. The sensor layer 200 may obtain a coordinate of the input device 2000 through the first pen electrode 2610, and may also obtain a slope of the input device 2000 through the second pen electrode 2620.

The pen electrode 2600 may have an input region of a second width WE2. The second width WE2 of the input region of the pen electrode 2600 may be less than the first width WE1 of the input region of the user's body 3000.

The power source 2100 may include one of a battery and a high-capacitance capacitor each of which provides the input device 2000 with power. The memory 2200 may store information about functions of the input device 2000. The controller 2300 may control an operation of the input device 2000. Each of the transmitter 2400 and the receiver 2500 may communicate through the pen electrode 2600 with the electronic device 1000. The transmitter 2400 may be called a signal generator or a transmission circuit, and the receiver 2500 may be called a signal receiver or a receiver circuit.

Figure 3:
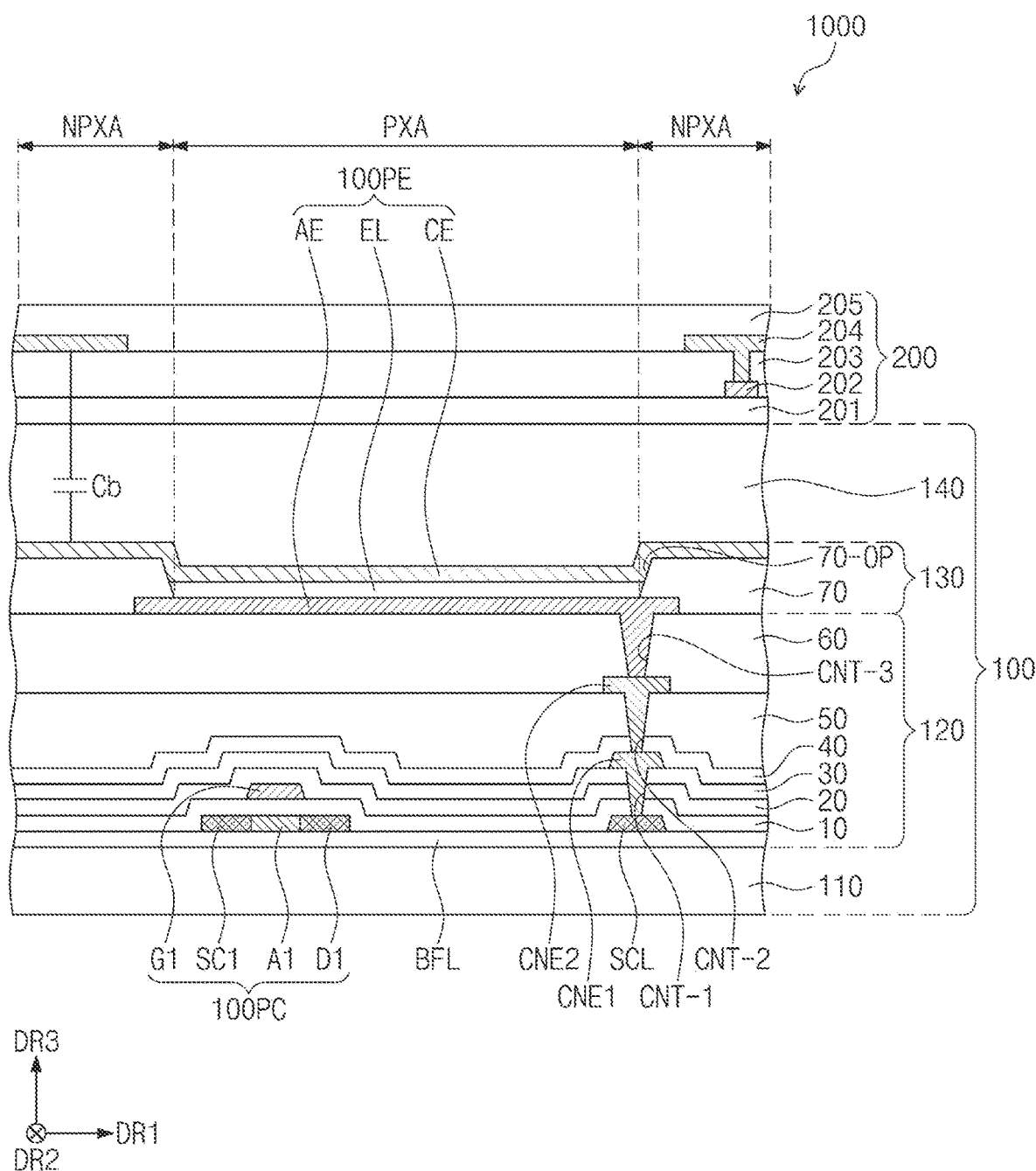
FIG. 3 illustrates a cross-sectional view showing an electronic device according to some embodiments of the present invention.

FIG. 3 illustrates a cross-sectional view showing an electronic device according to some embodiments of the present invention.

Referring to FIG. 3, the display layer 100 may include a base layer 110, a circuit layer 120, a light emitting element layer 130, and an encapsulation layer 140.

The base layer 110 may be a member that provides a base surface on which the circuit layer 120 is located. The base layer 110 may be a glass substrate, a metal substrate, or a polymer substrate. However, some embodiments of the present invention are not limited thereto, and the base layer 110 may be an inorganic layer, an organic layer, or a composite material layer.

The base layer 110 may have a multi-layered structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be called a base barrier layer. Each of the first and second synthetic resin layers may include a polyimide-based resin. Additionally, or alternatively, each of the first and second synthetic resin layers may include at least one selected from an acrylate-based resin, a methacrylate-based resin, a polyisoprene-based resin, a vinyl-based resin, an epoxy-based resin, an urethane-based resin, a cellulose-based resin, a siloxane-based resin, a polyamide-based resin, and a perylene-based resin. In this description, the language "X-based resin" may mean a resin including a functional group of X.

The circuit layer 120 may be located on the base layer 110. The circuit layer 120 may include a dielectric layer, a semiconductor pattern, a conductive pattern, a signal line, and the like. Coating and deposition processes may be employed such that a dielectric layer, a semiconductor layer, and a conductive layer are formed on the base layer 110, and then a photolithography process may be performed several times to selectively pattern the dielectric layer, the semiconductor layer, and the conductive layer. Afterwards, there may be formed the semiconductor pattern, the conductive pattern, and the signal line included in the circuit layer 120.

At least one inorganic layer may be formed on a top surface of the base layer 110. The inorganic layer may include at least one selected from aluminum oxide, titanium oxide, silicon oxide, silicon oxynitride, zirconium oxide, and hafnium oxide. The inorganic layer may be formed to have a multi-layered structure. The multi-layered inorganic layers may constitute a barrier layer and/or a buffer layer. In some embodiments, the display layer 100 is illustrated to include a buffer layer BFL.

The buffer layer BFL may increase a bonding force between the base layer 110 and the semiconductor pattern. The buffer layer BFL may include a silicon oxide layer and a silicon nitride layer, and the silicon oxide layer and the silicon nitride layer may be alternately stacked.

The semiconductor pattern may be located on the buffer layer BFL. The semiconductor pattern may include polysilicon. Embodiments according to the present invention, however, are not limited thereto, and the semiconductor pattern may include amorphous silicon or metal oxide.

FIG. 3 merely depicts a portion of the semiconductor pattern, and the semiconductor pattern may further be arranged at other regions. The semiconductor pattern may be specifically arranged over pixels. The semiconductor pattern may have different electrical characteristics based on whether being doped or not. The semiconductor pattern may include a first region whose conductivity is high and a second region whose conductivity is low. The first region may be doped with n-type or p-type impurities. A p-type transistor may include a doped region implanted with p-type impurities, and an n-type transistor may include a doped region implanted with n-type impurities. The second region may be an undoped region or may be implanted with impurities whose concentration is less than that of the impurities implanted into the first region.

The first region may have conductivity greater than that of the second region, and may substantially serve as an electrode and a signal line. The second region may substantially correspond to an active (or channel) of a transistor. For example, a portion of the semiconductor pattern may be an active of a transistor, another portion of the semiconductor pattern may be a source or drain of the transistor, and still another portion of the semiconductor pattern may be a connection electrode or a connection signal line.

Each of the pixels may have an equivalent circuit including seven transistors, one transistor, and a light emitting element, and the equivalent circuit of the pixel may be variously changed. FIG. 3 depicts by way of example a pixel including one transistor 100PC and a light emitting element 100PE.

A source SC1, an active A1, and a drain D1 of the transistor 100PC may be formed of the semiconductor pattern. When viewed in cross-section, the source SC1 and the drain D1 may extend in opposite directions from the active A1. FIG. 3 partially shows a connection signal line SCL formed of the semiconductor pattern. According to some embodiments, when viewed in a plan view, the connection signal line SCL may be electrically connected to the drain D1 of the transistor 100PC.

A first dielectric layer 10 may be located on the buffer layer BFL. The first dielectric layer 10 may commonly overlap a plurality of pixels and may cover the semiconductor pattern. The first dielectric layer 10 may be one or more of an inorganic layer and an organic layer, and may have a single-layered or multi-layered structure. The first dielectric layer 10 may include at least one selected from aluminum oxide, titanium oxide, silicon oxide, silicon oxynitride, zirconium oxide, and hafnium oxide. In some embodiments, the first dielectric layer 10 may be a single-layered silicon oxide layer. Likewise, the first dielectric layer 10, a dielectric layer of the circuit layer 120 may be one or more of an inorganic layer and an organic layer, and may have a single-layered or multi-layered structure. The inorganic layer may include at least one of the materials mentioned above, but embodiments according to the present invention are not limited thereto.

The transistor 100PC may have a gate G1 located on the first dielectric layer 10. The gate G1 may be a portion of a metal pattern. The gate G1 may overlap the active A1. The gate G1 may serve as a mask when the semiconductor pattern is doped.

A second dielectric layer 20 may be located on the first dielectric layer 10 and may cover the gate G1. The second dielectric layer 20 may commonly overlap the pixels. The second dielectric layer 20 may be one or more of an inorganic layer and an organic layer, and may have a single-layered or multi-layered structure. In some embodiments, the second dielectric layer 20 may be a single-layered silicon oxide layer.

A third dielectric layer 30 may be located on the second dielectric layer 20, and in some embodiments, the third dielectric layer 30 may be a single-layered silicon oxide layer A first connection electrode CNE1 may be located on the third dielectric layer 30. The first connection electrode CNE1 may be coupled to a connection signal line SCL through a contact hole CNT-1 that penetrates the first, second, and third dielectric layers 10, 20, and 30.

A fourth dielectric layer 40 may be located on the third dielectric layer 30. The fourth dielectric layer 40 may be a single-layered silicon oxide layer. A fifth dielectric layer 50 may be located on the fourth dielectric layer 40. The fifth dielectric layer 50 may be an organic layer.

A second connection electrode CNE2 may be located on the fifth dielectric layer 50. The second connection electrode CNE2 may be coupled to the first connection electrode CNE1 through a contact hole CNT-2 that penetrates the fourth and fifth dielectric layers 40 and 50.

A sixth dielectric layer 60 may be located on the fifth dielectric layer 50 and may cover the second connection electrode CNE2. The sixth dielectric layer 60 may be an organic layer. The light emitting element layer 130 may be located on the circuit layer 120. The light emitting element layer 130 may include a light emitting element 100PE. For example, the light emitting element layer 130 may include an organic light emitting material, a quantum dot, a quantum rod, a micro-led, or a nano-led. The light emitting element 100PE may include a first electrode AE, an emission layer EL, and a second electrode CE.

The first electrode AE may be located on the sixth dielectric layer 60. The first electrode AE may be connected to the second connection electrode CNE2 through a contact hole CNT-3 that penetrates the sixth dielectric layer 60.

A pixel definition layer 70 may be located on the sixth dielectric layer 60 and may cover a portion of the first electrode AE. An opening 70-OP may be defined in the pixel definition layer 70. The opening 70-OP of the pixel definition layer 70 may expose at least a portion of the first electrode AE. According to some embodiments, a light emitting region PXA may be defined to correspond to the portion of the first electrode AE, which portion is exposed to the opening 70-OP. A non-light emitting region NPXA may surround the light emitting region PXA.

The emission layer EL may be located on the first electrode AE. The emission layer EL may be located in the opening 70-OP. For example, a plurality of emission layers EL may be formed on corresponding pixels. When the emission layers EL are formed on corresponding pixels, the emission layers EL may each emit light having at least one of blue, red, or green colors. Embodiments according to the present invention, however, are not limited thereto, and the emission layer EL may be provided which is commonly connected to the pixels. In this case, the emission layer EL may provide a blue light or a white light.

The second electrode CE may be located on the emission layer EL. The second electrode CE may be commonly located on a plurality of pixels, while having a single unitary shape. The second electrode CE may be supplied with a common voltage and may be called a common electrode.

According to some embodiments, a hole control layer may be located between the first electrode AE and the emission layer EL. The hole control layer may be commonly located on the light emitting region PXA and the non-light emitting region NPXA. The hole control layer may include a hole transport layer and may further include a hole injection layer. An electrode control layer may be located between the emission layer EL and the second electrode CE. The electrode control layer may include an electrode transport layer and may further include an electrode injection layer. An open mask may be used to form the hole control layer and the electrode control layer that are commonly arranged on a plurality of pixels.

The encapsulation layer 140 may be located on the light emitting element layer 130. The encapsulation layer 140 may include an inorganic layer, an organic layer, and an inorganic layer that are sequentially stacked, but no limitation is imposed on the constituent layers of the encapsulation layer 140.

The inorganic layers may protect the light emitting element layer 130 against moisture and oxygen, and the organic layer may protect the light emitting element layer 130 against foreign substances such as dust particles. The inorganic layers may include a silicon nitride layer, a silicon oxynitride layer, a silicon oxide layer, a titanium oxide layer, or an aluminum oxide layer. The organic layer may include an acryl-based organic layer, but embodiments according to the present invention are not limited thereto.

A successive process may be employed to form the sensor layer 200 on the display layer 100. In this case, it may be expressed that the sensor layer 200 is directly arranged on the display layer 100. The phrase "directly arranged on" or "directly located on" may mean that no third component is located between the sensor layer 200 and the display layer 100. For example, no adhesive member may be separately located between the sensor layer 200 and the display layer 100. In this case, the electronic device 1000 may decrease in thickness.

The sensor layer 200 may include a base dielectric layer 201, a first conductive layer 202, a sensing dielectric layer 203, a second conductive layer 204, and a cover dielectric layer 205.

The base dielectric layer 201 may be an inorganic layer that includes one of silicon nitride, silicon oxynitride, and silicon oxide. Alternatively, the base dielectric layer 201 may be an organic layer that includes an epoxy-based resin, an acryl-based resin, or an imide-based resin. The base dielectric layer 201 may have either a single-layered structure or a multi-layered structure stacked along the third direction DR3.

Each of the first and second conductive layers 202 and 204 may have either a single-layered structure or a multi-layered structure stacked along the third direction DR3.

The single-layered conductive layer may include a metal layer or a transparent conductive layer. The metal layer may include molybdenum, silver, titanium, copper, aluminum, or an alloy thereof. The transparent conductive layer may include transparent conductive oxide, such as indium tin oxide (ITO), indium zinc oxide (IZO), zinc oxide (ZnO), indium zinc tin oxide (IZTO). Additionally or alternatively, the transparent conductive layer may include a metal nanowire, a graphene, or a conductive polymer such as PEDOT.

The multi-layered conductive layer may include metal layers. The metal layers may include, for example, trilayered structure of titanium/aluminum/titanium. The multi-layered conductive layer may include at least one metal layer and at least one transparent conductive layer.

One or both of the sensing dielectric layer 203 and the cover dielectric layer 205 may include an inorganic layer. The inorganic layer may include at least one selected from aluminum oxide, titanium oxide, silicon oxide, silicon oxynitride, zirconium oxide, and hafnium oxide.

A parasitic capacitance Cb may occur between the sensor layer 200 and the second electrode CE. A reduction in distance between the sensor layer 200 and the second electrode CE may induce an increase in the parasitic capacitance Cb. The greater the parasitic capacitance Cb, the smaller ratio of variation in capacitance with respect to the reference value. The variation in capacitance may indicate a capacitance change that occurs between before and after an input from an input means, for example, the input device (see, e.g., element 2000 of FIG. 2) or the user's body (see, e.g., element 3000 of FIG. 2).

A driver chip that processes signals detected from the sensor layer 200 may perform a leveling operation in which a value corresponding to the parasitic capacitance Cb is removed from the detected signal. The leveling operation may increase the ratio of variation in capacitance with respect to a reference value, and therefore detection sensitivity may be improved.

However, the capability of removing the value corresponding to the parasitic capacitance Cb may depend on a specification of the driver chip. For example, when about 500 pF is assigned to a maximum value of the parasitic capacitance Cb, and when about 200 pF is given to a value of the parasitic capacitance Cb that the driver chip can remove from a signal detected from the sensor layer 200, the reference value may not be sufficiently reduced by the driver chip. In this case, the ratio of variation in capacitance may be insignificant compared to the reference value, and thus the driver chip may not detect the variation in capacitance or may consider the variation in capacitance as noise, which may result in malfunction that fails to detect a touch coordinate. According to the present invention, an electrode structure of the sensor layer 200 may be changed such that the maximum value of the parasitic capacitance Cb may be reduced below a certain value. In this case, it may be possible to increase accuracy of coordinate detection even when the driver chip has low performance. The certain value may be about 200 pF, but embodiments according to the present invention are not particularly limited thereto.

Figure 4:
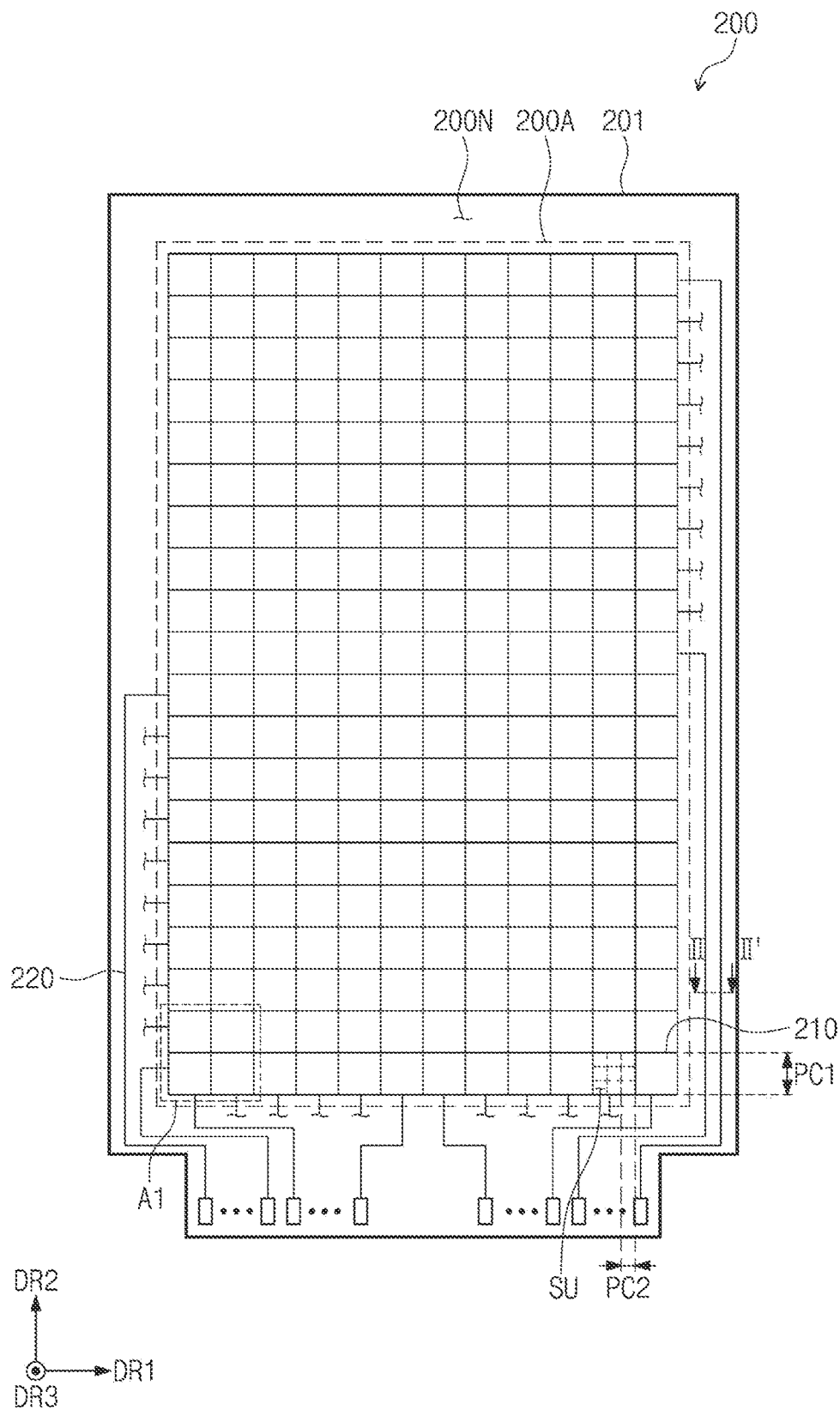
FIG. 4 illustrates a plan view showing a sensor layer according to some embodiments of the present invention.

FIG. 4 illustrates a plan view showing a sensor layer according to some embodiments of the present invention.

Referring to FIG. 4, the sensor layer 200 may include an active region 200A and a peripheral region 200N. The active region 200A may be an area that is activated with an electric signal. For example, the active region 200A may be an input detection section. The active region 200A may be called a sensing region. The peripheral region 200N may surround the active region 200A.

The sensor layer 200 may include a base dielectric layer 201, a plurality of sensing units 210, and a plurality of wiring lines 220. The plurality of sensing units 210 may be located on the active region 200A. The plurality of wiring lines 220 may be located on the peripheral region 200N.

The plurality of sensing units 210 may have a first pitch PC1. The first pitch PC1 of the plurality of sensing units 210 may be less than the first width WE1 of the input region of the user's body 3000 (see FIG. 2). The first pitch PC1 may range from about 3.5 mm to about 4.5 mm. For example, the first pitch PC1 may be about 4 mm. According to the present invention, each of the plurality of sensing units 210 may have an area less than that of the input region of the user's body 3000. Therefore, the sensor layer 200 may exactly detect coordinates that are input by the user's body 3000.

Each of the plurality of sensing units 210 may include a plurality of sub-sensing units SU. As discussed below in FIG. 5A, an electrode 211 and a cross electrode 212 may intersect each other at each of the plurality of sub-sensing units SU.

The plurality of sub-sensing units SU may have a second pitch PC2. The second pitch PC2 of the plurality of sub-sensing units SU may be less than the second width WE2 of the pen electrode 2600 included in the input device 2000 (see FIG. 2). The second pitch PC2 may range from about 1.0 mm to about 2.0 mm. For example, the second pitch PC2 may be about 1.5 mm. According to the present invention, each of the plurality of sub-sensing units SU may have an area less than that of the input region of the pen electrode 2600 included in the input device 2000. Therefore, the sensor layer 200 may exactly detect coordinates that are input by the input device 2000.

The sensor layer 200 may operate under the first mode in which information about external inputs are obtained based on a variation in mutual capacitance between electrodes included in the plurality of sensing units 210, or under the second mode in which inputs from the input device 2000 are detected based on a variation in capacitance of each of electrodes included in the plurality of sub-sensing units SU. The first and second modes will be further discussed in detail below.

The plurality of sensing units 210 may be arranged along the first direction DR1 and the second direction DR2.

The plurality of wiring lines 220 may be electrically connected to the plurality of sub-sensing units SU.

Figure 5B:
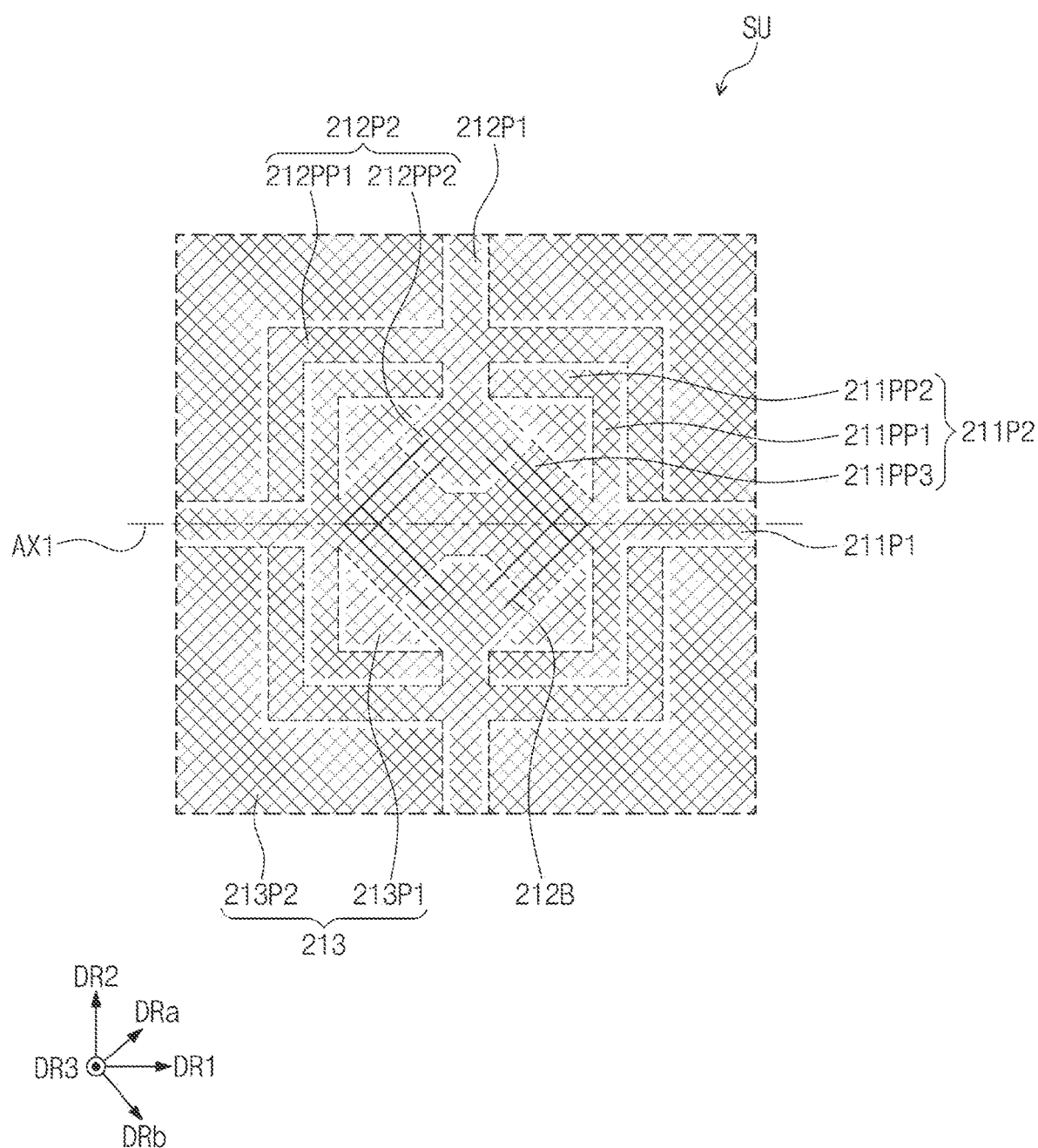
FIG. 5B illustrates a plan view showing one of a plurality of sub-sensing units according to some embodiments of the present invention.

FIG. 5A illustrates a plan view showing one of a plurality of sensing units according to some embodiments of the present invention. FIG. 5B illustrates a plan view showing one of a plurality of sub-sensing units according to some embodiments of the present invention.

Referring to FIGS. 5A and 5B, a single sensing unit 210 may include a plurality of sub-sensing units SU. The plurality of sub-sensing units SU may be arranged in the first direction DR1 and the second direction DR2. For example, nine sub-sensing units SU may be provided.

The sensing unit 210 may include a plurality of electrodes 211, a plurality of cross electrodes 212, and a dummy electrode 213. The plurality of electrodes 211, the plurality of cross electrodes 212, and the dummy electrode 213 may have their mesh structures.

Based on a variation in mutual capacitance between the plurality of electrodes 211 and the plurality of cross electrodes 212, the sensor layer (see, e.g., element 200 of FIG. 4) may obtain information about external inputs.

Each of the plurality of electrodes 211 may extend in the first direction DR1. The plurality of electrodes 211 may be arranged spaced apart from each other in the second direction DR2.

Each of the plurality of cross electrodes 212 may extend in the second direction DR2. The plurality of cross electrodes 212 may be arranged spaced apart from each other in the first direction DR1. The plurality of electrodes 211 may intersect the plurality of cross electrodes 212.

A plurality of dummy electrodes 213 may surround the plurality of electrodes 211 and the plurality of cross electrodes 212. The presence of the dummy electrodes 213 may reduce a difference in transmittance or reflectance between portions having the plurality of electrodes 211 or cross electrodes 212 and portions not having the plurality of electrodes 211 or cross electrodes 212. As a result, it may be possible to prevent recognition of specific boundaries, for example, boundaries between the plurality of electrodes 211 and the plurality of cross electrodes 212 or boundaries between portions having the plurality of electrodes 211 or cross electrodes 212 and portions not having the plurality of electrodes 211 or cross electrodes 212.

Each of the plurality of electrodes 211 may include a first portion 211P1 and a plurality of second portions 211P2. The first portion 211P1 may extend in the first direction DR1. The plurality of second portions 211P2 may protrude from the first portion 211P1. The first portion 211P1 and the plurality of second portions 211P2 may be provided unitarily with each other.

The plurality of second portions 211P2 may include a plurality of first pattern portions 211PP1, a plurality of second pattern portions 211PP2, and a plurality of third pattern portions 211PP3.

Each of the plurality of first pattern portions 211PP1 may protrude from the first portion 211P1. For example, each of the plurality of first pattern portions 211PP1 may protrude in the second direction DR2 from the first portion 211P1. For example, a single sub-sensing unit SU may include four first pattern portions 211PP1.

The plurality of second pattern portions 211PP2 may each protrude from the plurality of first pattern portions 211PP1 in a direction adjacent to a first cross portion 212P1 which will be discussed below. For example, the plurality of second pattern portions 211PP2 may each protrude in the first direction DR1 from the plurality of first pattern portions 211PP1. For example, a single sub-sensing unit SU may include four second pattern portions 211PP2.

Each of the plurality of first pattern portions 211PP1 may have an end adjacent to the first portion 211P1 and other end adjacent to one of the plurality of second pattern portions 211PP2. The first pattern portion 211PP1 and the second pattern portion 211PP2 may be provided unitarily with each other.

Each of the plurality of third pattern portions 211PP3 may protrude from the first portion 211P1 in a first cross direction DRa or a second cross direction DRb. The first cross direction DRa may intersect the first direction DR1 and the second direction DR2. The second cross direction DRb may intersect the first cross direction DRa. The first cross direction DRa and the second cross direction DRb may be orthogonal to each other. For example, a single sub-sensing unit SU may include four third pattern portions 211PP3.

The plurality of cross electrodes 212 may include a plurality of cross patterns 212PT and a plurality of bridge patterns 212B.

Each of the plurality of cross patterns 212PT may include a first cross pattern 212PT1 and a second cross pattern 212PT2 that are spaced apart from each other across the first portion 211P1. The first cross pattern 212PT1 and the second cross pattern 212PT2 may have their shapes that are symmetrical with each other about a first axis AX1 that extends along the first direction DR1.

Each of the first and second cross patterns 212PT1 and 212PT2 may include a first cross portion 212P1 and a plurality of second cross portions 212P2.

The first cross portion 212P1 may extend in the second direction DR2. The plurality of second cross portions 212P2 may protrude from the first cross portion 212P1. The first cross portion 212P1 and the plurality of second cross portions 212P2 may be provided unitarily with each other.

The plurality of second cross portions 212P2 may include a plurality of first cross pattern portions 212PP1 and a plurality of second cross pattern portions 212PP2.

The plurality of first cross pattern portions 212PP1 may surround the plurality of first pattern portions 211PP1 and the plurality of second pattern portions 211PP2. Each of the plurality of first cross pattern portions 212PP1 may include a first section and a second section. The second section may extend in the second direction DR2 and may be spaced apart in the first direction DR1 from the first cross portion 212P1. The second section may be adjacent to one of the plurality of second pattern portions 211PP2. The first section may be located between the first cross portion 212P1 and the second section. The first section may be adjacent to one of the plurality of first pattern portions 211PP1. The first section and the second section may be provided unitarily with each other. For example, a single sub-sensing unit SU may include four first cross pattern portions 212PP1.

The plurality of second cross pattern portions 212PP2 may protrude in a direction that faces the plurality of third pattern portions 211PP3. Each of the plurality of second cross pattern portions 212PP2 may protrude from the first cross portion 212P1 in the first cross direction DRa or the second cross direction DRb. The plurality of second cross pattern portions 212PP2 may be located adjacent to the plurality of third pattern portions 211PP3. For example, a single sub-sensing unit SU may include four second cross pattern portions 212PP2.

The plurality of bridge patterns 212B may be electrically connected to the plurality of cross patterns 212PT. The plurality of bridge patterns 212B may be insulated from and intersect the first portion 211P1. The plurality of bridge patterns 212B may extend in the first cross direction DRa and the second cross direction DRb. The plurality of bridge patterns 212B may have their mesh structures.

Each of the plurality of bridge patterns 212B may electrically connect the first cross pattern 212PT1 to the second cross pattern 212PT2.

The plurality of bridge patterns 212B may be located at a level from that of the plurality of electrodes 211 and that of the plurality of cross patterns 212PT.

The dummy electrode 213 may include a plurality of first dummy portions 213P1 and a plurality of second dummy portions 213P2.

The plurality of first dummy portions 213P1 may be located between the plurality of first pattern portions 211PP1, the plurality of second pattern portions 211PP2, the plurality of third pattern portions 211PP3, and the plurality of first cross pattern portions 212PP1.

The plurality of second dummy portions 213P2 may be located adjacent to the first portion 211P1, the first cross portion 212P1, and the plurality of first cross pattern portions 212PP1.

The first cross pattern 212PT1 of one sub-sensing unit SU may be provided unitarily with the second cross pattern 212PT2 of another sub-sensing unit SU adjacent in the second direction DR2 to the one sub-sensing unit SU.

The electrodes 211 of two sub-sensing units SU adjacent to each other in the second direction DR2 may be called a first electrode and a second electrode, and the first cross pattern 212PT1 of one of the two sub-sensing units SU and the second cross pattern 212PT2 of the other of the two subs-sensing units SU may be called a third electrode.

The sensor layer 200 may include the plurality of sensing units 210 that are repeatedly arranged at the first pitch PC1 less than the first width WE1 of the input region of the user's body 3000 (see FIG. 2). Each of the plurality of sensing units 210 may have an area less than that of the input region of the user's body 3000.

According to the present invention, when the user's body 3000 is detected, the sensing unit 210 may be located within the coverage of the input region of the user's body 3000 that overlaps the sensor layer 200. It may be possible to normally detect a variation in mutual capacitance between the plurality of cross electrodes 212 and the plurality of electrodes 211 when the user's body 3000 is detected. Therefore, the sensor layer 200 may increase in detection reliability and coordinate accuracy for the user's body 3000.

In addition, the sensor layer 200 may include the plurality of sub-sensing units SU that are repeatedly arranged at the second pitch PC2 less than the second width WE2 of the input region of the pen electrode 2600 included in the input device 2000 (see FIG. 2). An input region of the input device 2000 may have an area less than that of each of the plurality of sub-sensing units SU. The electrode 211 and the cross electrode 212 may intersect each other at each of the plurality of sub-sensing units SU.

Differently from the present invention, when only one cross portion is present because one sensing unit 210 includes one sub-sensing unit SU, a pitch of the sensing unit 210 may be greater than the second width WE2 of the input region of the pen electrode 2600 included in the input device 2000. On one sensing unit 210, there may be a difference between a first capacitance CAP1a detected by the first pen electrode 2610 when the input device 2000 is placed at a first position and a second capacitance CAP1b detected by the first pen electrode 2610 when the input device 2000 is placed at a second position. In this case, it may be likely to reduce coordinate accuracy of the sensor layer 200. In contrast, according to the present invention, when the input device 2000 is detected, the sub-sensing unit SU may be located within the coverage of the input region of the input device 2000 that overlaps the sensor layer 200. On one sensing unit 210, a reduced difference may be provided between the first capacitance CAP1a detected by the first pen electrode 2610 when the input device 2000 is placed at the first position and the second capacitance CAP1b detected by the first pen electrode 2610 when the input device 2000 is placed at the second position. For example, on one sensing unit 210, there may be a reduced deviation in capacitance between the sensor layer 200 and the input device 2000, which deviation depends on the position of the input device 2000. Therefore, the sensor layer 200 may increase in coordinate accuracy and detection reliability for the input device 2000.

Moreover, according to the present invention, on one sensing unit 210, a reduced difference may be provided between a first capacitance CAP2a detected by the second pen electrode 2620 when the input device 2000 is placed at the first position and a second capacitance CAP2b detected by the second pen electrode 2620 when the input device 2000 is placed at the second position. For example, on one sensing unit 210, there may be a reduced deviation in capacitance between the sensor layer 200 and the input device 2000, which deviation depends on the position of the input device 2000. Therefore, the sensor layer 200 may increase in slope accuracy and detection reliability for the input device 2000.

Figure 6A:
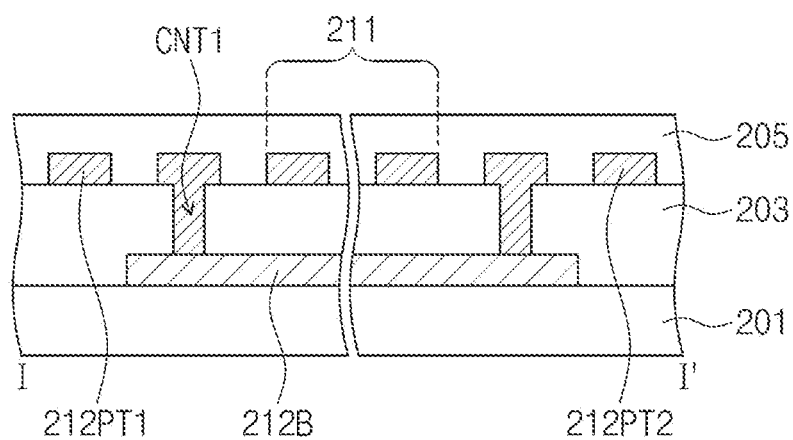
FIG. 6A illustrates a cross-sectional view taken along the line I-I' of FIG. 5A.

FIG. 6A illustrates a cross-sectional view taken along line I-I' of FIG. 5A. In explaining FIG. 6A, the same reference symbols are allocated to the components discussed in FIGS. 5A and 5B, and some repetitive description thereof may be omitted.

Referring to FIG. 6A, the bridge pattern 212B may be located on the base dielectric layer 201. The sensing dielectric layer 203 may be located on the bridge pattern 212B. The sensing dielectric layer 203 may cover the bridge pattern 212B. The sensing dielectric layer 203 may include an inorganic material, an organic material, or a composite material.

The first cross pattern 212PT1, the second cross pattern 212PT2, and the electrode 211 may be located on the sensing dielectric layer 203.

A plurality of first contact holes CNT1 may be formed to penetrate the sensing dielectric layer 203 in the third direction DR3. The first cross pattern 212PT1 and the second cross pattern 212PT2 may be electrically connected to the bridge pattern 212B through the plurality of first contact holes CNT1.

The cover dielectric layer 205 may be located on the first cross pattern 212PT1, the second cross pattern 212PT2, and the electrode 211. The cover dielectric layer 205 may cover the first cross pattern 212PT1, the second cross pattern 212PT2, and the electrode 211. The cover dielectric layer 205 may include an inorganic material, an organic material, or a composite material.

FIG. 6A depicts by way of example a bottom bridge structure in which the bridge pattern 212B is located below the first cross pattern 212PT1, the second cross pattern 212PT2, and the electrode 211, but according to some embodiments of the present invention, the structure of the sensor layer (see, e.g., element 200 of FIG. 4) is not limited to that mentioned above. For example, the sensor layer 200 according to some embodiments of the present invention may have a top bridge structure in which the bridge pattern 212B is located above the first cross pattern 212PT1, the second cross pattern 212PT2, and the electrode 211.

Figure 6B:
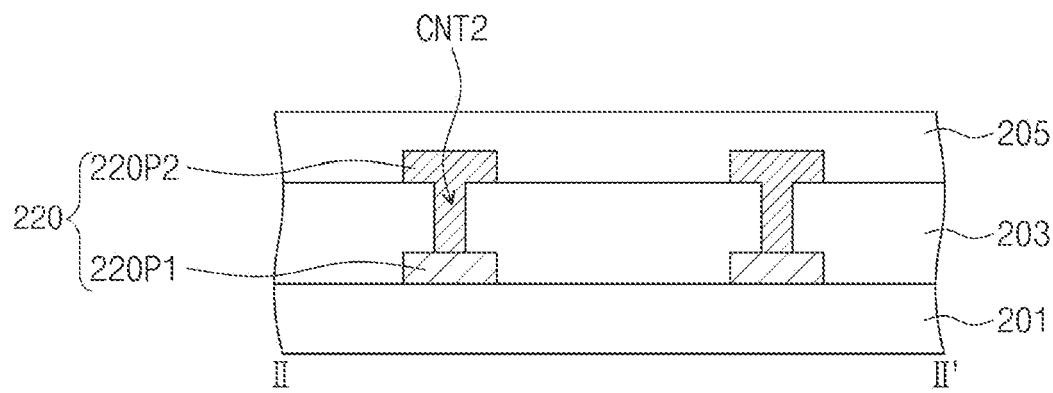
FIG. 6B illustrates a cross-sectional view taken along the line II-II' of FIG. 4

FIG. 6B illustrates a cross-sectional view taken along line II-II' of FIG. 4 In explaining FIG. 6B, the same reference symbols are allocated to the components discussed in FIG. 6A, and some repetitive description thereof may be omitted.

Referring to FIG. 6B, each of the plurality of wiring lines 220 may include a first line part 220P1 and a second line part 220P2.

The first line part 220P1 may be located on the base dielectric layer 201. The sensing dielectric layer 203 may be located on the first line part 220P1. The sensing dielectric layer 203 may cover the first line part 220P1.

The second line part 220P2 may be located on the first line part 220P1.

A plurality of second contact holes CNT2 may be formed to penetrate the sensing dielectric layer 203 in the third direction DR3. The first line part 220P1 and the second line part 220P2 may be connected to each other through the plurality of second contact holes CNT2.

The cover dielectric layer 205 may be located on the second line part 220P2. The cover dielectric layer 205 may cover the second line part 220P2.

FIG. 6B depicts by way of example a structure in which the first line part 220P1 and the second line part 220P2 are connected to each other, but according to some embodiments of the present invention, the structure of the sensor layer (see, e.g., element 200 of FIG. 4) is not limited to that mentioned above. For example, the sensing dielectric layer 203 may not include a plurality of second contact holes CNT2. The first line part 220P1 and the second line part 220P2 may be arranged to be spaced apart from each other in the third direction DR3.

Figure 7:
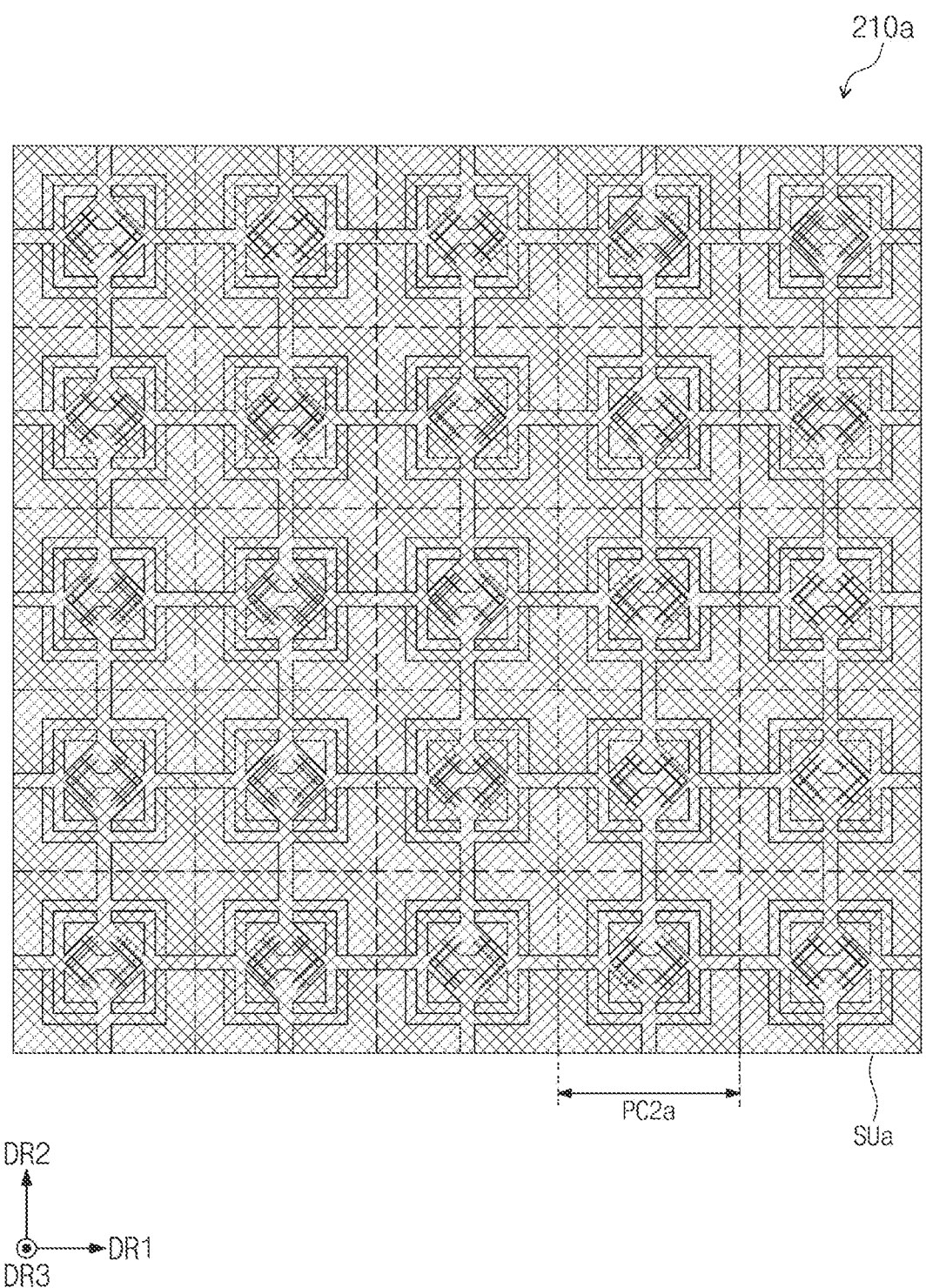
FIG. 7 illustrates a plan view showing one of a plurality of sensing units according to some embodiments of the present invention.

FIG. 7 illustrates a plan view showing one of a plurality of sensing units according to some embodiments of the present invention. In explaining FIG. 7, the same reference symbols are allocated to the components discussed in FIGS. 5A and 5B, and some repetitive description thereof may be omitted.

Referring to FIGS. 5B and 7, one sensing unit 210a may include a plurality of sub-sensing units SUa. The plurality of sub-sensing units SUa may be arranged in the first direction DR1 and the second direction DR2. For example, twenty-five sub-sensing units SUa may be provided. Embodiments according to the present invention, however, are not limited thereto, and no limitation is imposed on the number of the plurality of sub-sensing units SUa according to some embodiments of the present invention. For example, sixteen sub-sensing units SUa may be provided.

The plurality of sub-sensing units SUa may have a second pitch PC2a. The second pitch PC2a of the plurality of sub-sensing units SUa may be less than the second width WE2 of the input region of the pen electrode 2600 included in the input device 2000 (see FIG. 2). The second pitch PC2a may be less than the second pitch (see, e.g., element PC2 of FIG. 4) of the plurality of sub-sensing units (see, e.g., element SU of FIG. 5A). An input region of the input device 2000 may have an area less than that of each of the plurality of sub-sensing units SUa.

According to the present invention, when the input device 2000 is detected, the sub-sensing unit SUa may be located within the coverage of the input region of the input device 2000 that overlaps the sensor layer (see, e.g., element 200 of FIG. 4). Despite movement of the input device 2000, it may be possible for the sensor layer 200 to normally detect capacitance of each of the first portion 211P1, the second portion 211P2, the first cross portion 212P1, and the second cross portion 212P2. Therefore, the sensor layer 200 may increase in detection reliability for the input device 2000.

Figure 8:
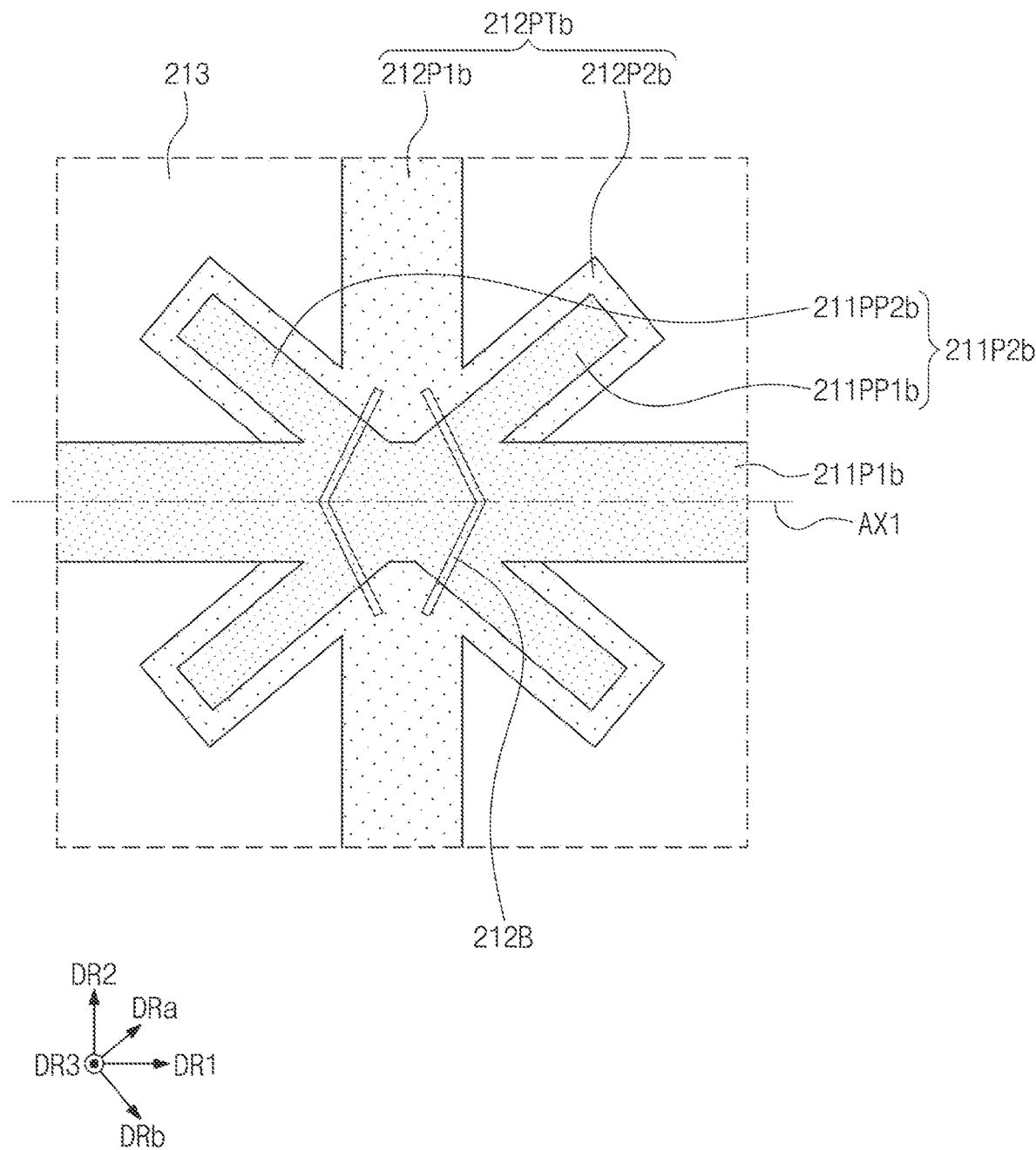
FIG. 8 illustrates a plan view showing one of a plurality of sub-sensing units according to some embodiments of the present invention.

FIG. 8 illustrates a plan view showing one of a plurality of sub-sensing units according to some embodiments of the present invention. In explaining FIG. 8, the same reference symbols are allocated to the components discussed with reference to FIG. 5B, and some repetitive description thereof may be omitted.

Referring to FIG. 8, a first portion 211P1b may extend in the first direction DR1. A plurality of second portions 211P2b may protrude from the first portion 211P1b. The first portion 211P1b and the plurality of second portions 211P2b may be provided unitarily with each other. The first portion 211P1b and the plurality of second portions 211P2b may have their mesh structures.

The plurality of second portions 211P2b may include a plurality of first pattern portions 211PP1b and a plurality of second pattern portions 211PP2b.

Each of the plurality of first pattern portions 211PP1b may protrude from the first portion 211P1b. For example, each of the plurality of first pattern portions 211PP1b may protrude in the first cross direction DRa. The first cross direction DRa may intersect the first direction DR1 and the second direction DR2.

Each of the plurality of second pattern portions 211PP2b may protrude from the first portion 211P1b. For example, each of the plurality of second pattern portions 211PP2b may protrude in the second cross direction DRb. The second cross direction DRb may intersect the first direction DR1 and the second direction DR2. The second cross direction DRb may intersect the first cross direction DRa. The first cross direction DRa and the second cross direction DRb may be orthogonal to each other.

A plurality of cross patterns 212PTb may be spaced apart from each other across the first portion 211P1b. The plurality of cross patterns 212PTb may be symmetrical with each other about the first axis AX1.

The plurality of cross patterns 212PTb may include a first cross portion 212P1b and a plurality of second cross portions 212P2b.

The first cross portion 212P1b may extend in the second direction DR2. The plurality of second cross portions 212P2b may protrude from the first cross portion 212P1b. The first cross portion 212P1b and the plurality of second cross portions 212P2b may be provided unitarily with each other. The first cross portion 212P1b and the plurality of second cross portions 212P2b may have their mesh structures.

The plurality of second cross portions 212P2b may correspondingly surround the plurality of second portions 211P2b. One of the plurality of second cross portions 212P2b may protrude in the first cross direction DRa and may be located adjacent to the plurality of first pattern portions 211PP1b. Another of the plurality of second cross portions 212P2b may protrude in the second cross direction DRb and may be located adjacent to the plurality of second pattern portions 211PP2b.

Figure 9:
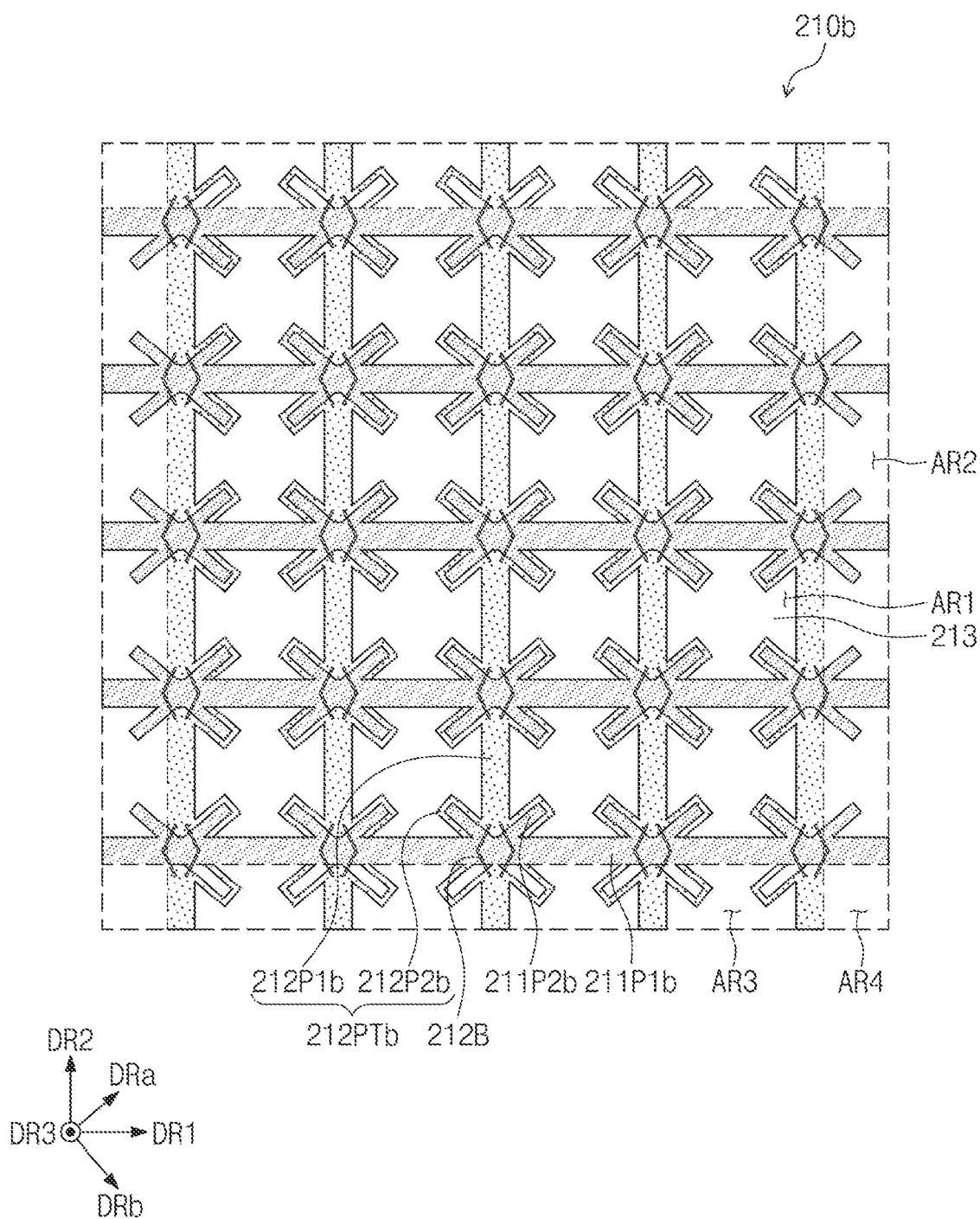
FIG. 9 illustrates a plan view showing one of a plurality of sensing units according to some embodiments of the present invention.

FIG. 9 illustrates a plan view showing one of a plurality of sensing units according to some embodiments of the present invention. In explaining FIG. 9, the same reference symbols are allocated to the components discussed with reference to FIG. 8, and some repetitive description thereof may be omitted.

Referring to FIG. 9, each of a plurality of sensing units 210b may include a first region AR1, a plurality of second regions AR2 that are adjacent in the first direction DR1 to the first region AR1, a plurality of third regions AR3 that are adjacent in the second direction DR2 to the first region AR1, and a plurality of fourth regions AR4 that are spaced apart from the first region AR1 in the first cross direction DRa and the second cross direction DRb.

The first region AR1 may be provided thereon with a plurality of first portions 211P1b, a plurality of second portions 211P2b, a plurality of cross patterns 212PTb, a plurality of bridge patterns 212B, and a dummy electrode 213.

The plurality of second regions AR2 may be provided thereon with a plurality of first portions 211P1b, a plurality of second portions 211P2b, and a dummy electrode 213. When viewed in plan, neither the plurality of cross patterns 212PTb nor the plurality of bridge patterns 212B may overlap the plurality of second regions AR2.

The plurality of third regions AR3 may be provided thereon with a plurality of cross patterns 212PTb, a plurality of bridge patterns 212B, and a dummy electrode 213. When viewed in plan, neither the plurality of first portions 211P1b nor the plurality of second portions 211P2b may overlap the plurality of third regions AR3.

The plurality of fourth regions AR4 may be provided thereon with a dummy electrode 213.

Figure 10:
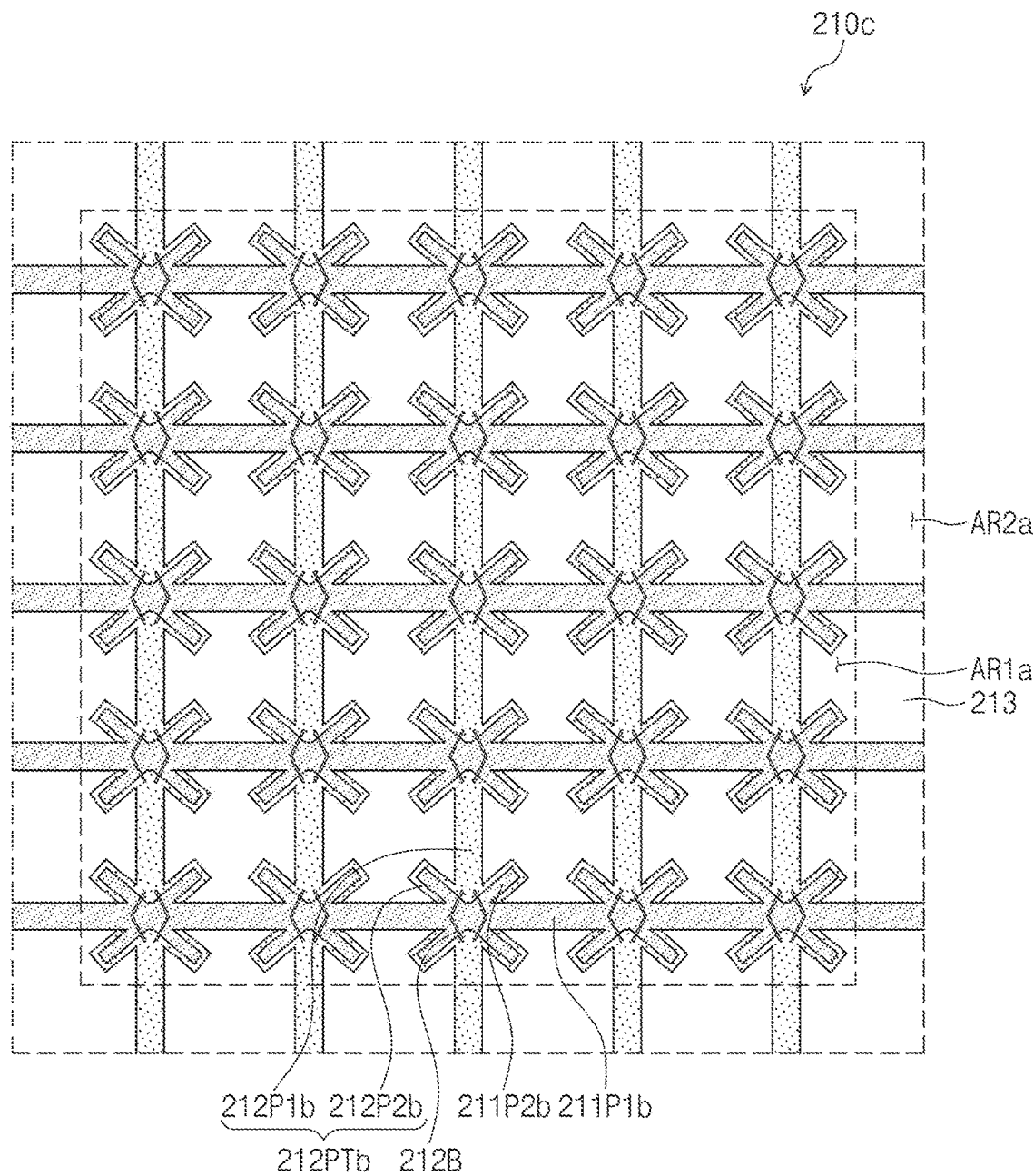
FIG. 10 illustrates a plan view showing one of a plurality of sensing units according to some embodiments of the present invention.

FIG. 10 illustrates a plan view showing one of a plurality of sensing units according to some embodiments of the present invention. In explaining FIG. 10, the same reference symbols are allocated to the components discussed in FIG. 8, and some repetitive description thereof may be omitted.

Referring to FIG. 10, each of a plurality of sensing units 210c may include a first region AR1a and a second region AR2a that surrounds the first region AR1a.

The first region AR1a may be provided thereon with a plurality of first portions 211P1b, a plurality of second portions 211P2b, a plurality of cross patterns 212PTb, a plurality of bridge patterns 212B, and a dummy electrode 213.

The second region AR2a may be provided thereon with a plurality of first portions 211P1b, a plurality of first cross portions 212P1b, and a dummy electrode 213.

Figure 11:
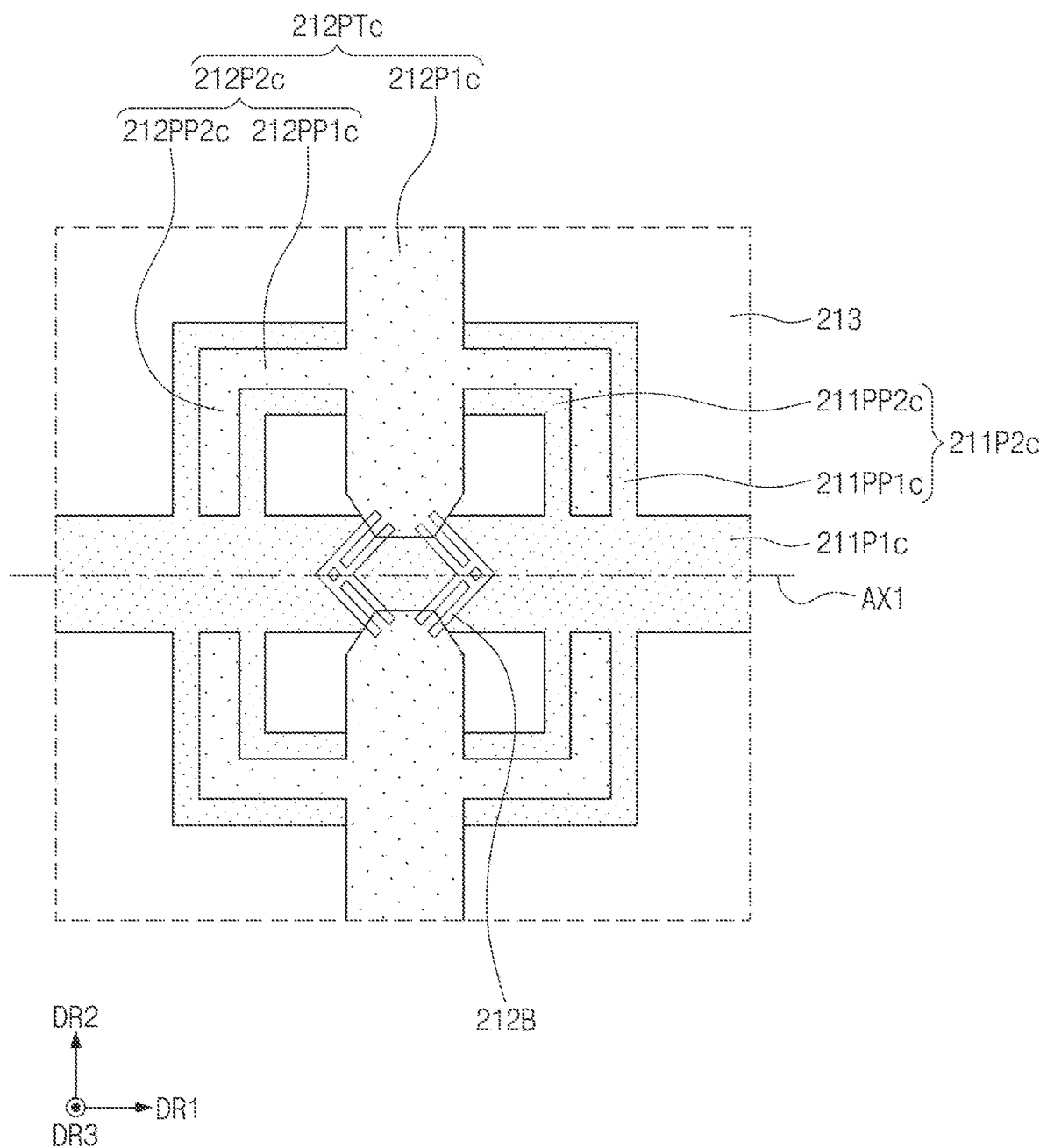
FIGS. 11 to 16 illustrate plan views showing one of a plurality of sub-sensing units according to some embodiments of the present invention.

FIG. 11 illustrates a plan view showing one of a plurality of sub-sensing units according to some embodiments of the present invention. In explaining FIG. 11, the same reference symbols are allocated to the components discussed with reference to FIG. 5B, and some repetitive description thereof may be omitted.

Referring to FIG. 11, a first portion 211P1c may extend in the first direction DR1. A plurality of second portions 211P2c may protrude from the first portion 211P1c. The first portion 211P1c and the plurality of second portions 211P2c may be provided unitarily with each other. The first portion 211P1c and the plurality of second portions 211P2c may have their mesh structures.

The plurality of second portions 211P2*c* may include a plurality of first pattern portions 211PP1*c* and a plurality of second pattern portions 211PP2*c*.

Each of the plurality of first pattern portions 211PP1*c* may protrude from the first portion 211P1*c*. Each of the plurality of first pattern portions 211PP1*c* may include a first section and a second section. The first section may protrude in the second direction DR2 from the first portion 211P1*c*. An end of the first section may be adjacent to the first portion 211P1*c*. The second section may protrude in the first direction DR1 from other end of the first section. The first section and the second section may be provided unitarily with each other.

The plurality of first pattern portions 211PP1*c* may correspondingly surround a plurality of first cross pattern portions 212PP1*c* and a plurality of second cross pattern portions 212PP2*c*.

Each of the plurality of second pattern portions 211PP2*c* may protrude from the first portion 211P1*c*. Each of the plurality of second pattern portions 211PP2*c* may include a third section and a fourth section. The third section may protrude in the second direction DR2 from the first portion 211P1*c*. An end of the third section may be adjacent to the first portion 211P1*c*. The fourth section may protrude in the first direction DR1 from other end of the third section. The third section and the fourth section may be provided unitarily with each other.

The plurality of second pattern portions 211PP2*c* may be correspondingly spaced apart from the plurality of first pattern portions 211PP1*c* across the plurality of first cross pattern portions 212PP1*c* and the plurality of second cross pattern portions 212PP2*c*.

A plurality of cross patterns 212PTc may be spaced apart from each other across the first portion 211P1*c*. The plurality of cross patterns 212PTc may be symmetrical with each other about the first axis AX1.

The plurality of cross patterns 212PTc may include a first cross portion 212P1*c* and a plurality of second cross portions 212P2*c*.

The first cross portion 212P1*c* may extend in the second direction DR2. The plurality of second cross portions 212P2*c* may protrude from the first cross portion 212P1*c*. The first cross portion 212P1*c* and the plurality of second cross portions 212P2*c* may be provided unitarily with each other. The first cross portion 212P1*c* and the plurality of second cross portions 212P2*c* may have their mesh structures.

The plurality of second cross portions 212P2*c* may be located between the plurality of first pattern portions 211PP1*c* and the plurality of second pattern portions 211PP2*c*. The plurality of second cross portions 212P2*c* may include the plurality of first cross pattern portions 212PP1*c* and the plurality of second cross pattern portions 212PP2*c*.

Each of the plurality of first cross pattern portions 212PP1*c* may protrude from the first cross portion 212P1*c*. For example, each of the plurality of first cross pattern portions 212PP1*c* may protrude in the first direction DR1 from the first cross portion 212P1*c*.

The plurality of second cross pattern portions 212PP2*c* may protrude from the plurality of first cross pattern portions 212PP1*c* in a direction adjacent to the first portion 211P1*c*. For example, the plurality of second cross pattern portions 212PP2*c* may protrude in the second direction DR2 from the plurality of first cross pattern portions 212PP1*c*.

Each of the plurality of first cross pattern portions 212PP1*c* may have one end adjacent to the first cross portion 212P1*c* and other end adjacent to one of the plurality of second cross pattern portions 212PP2*c*.

The plurality of second cross portions 212P2*b* may surround the plurality of second portions 211P2*b*. One of the plurality of second cross portions 212P2*b* may protrude in the first cross direction DRa and may be located adjacent to the plurality of first pattern portions 211PP1*b*. Another of the plurality of second cross portions 212P2*b* may protrude in the second cross direction DRb and may be located adjacent to the plurality of second pattern portions 211PP2*b*.

Figure 12:
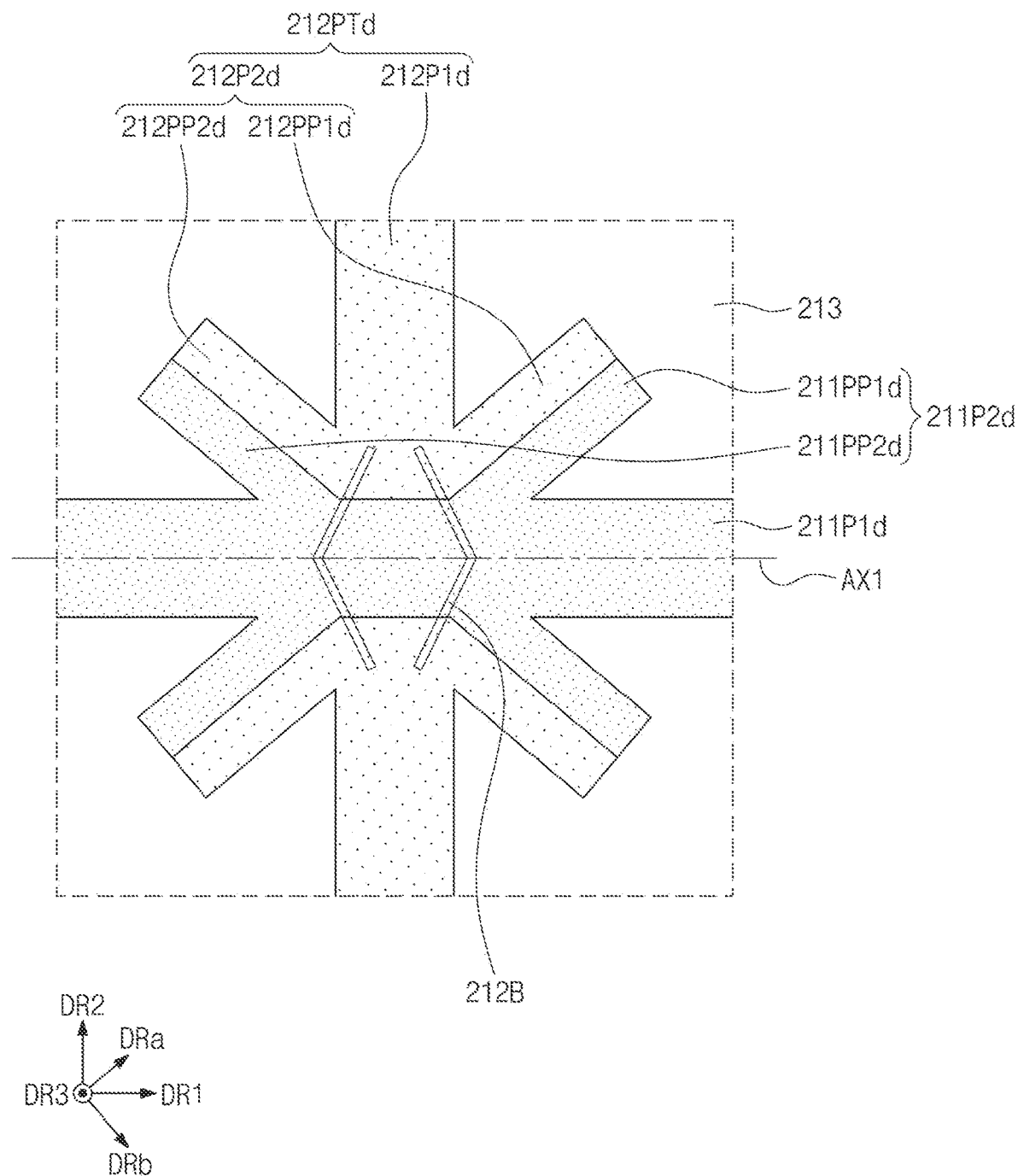

FIG. 12 illustrates a plan view showing one of a plurality of sub-sensing units according to some embodiments of the present invention. In explaining FIG. 12, the same reference symbols are allocated to the components discussed with reference to FIG. 5B, and some repetitive description thereof may be omitted.

Referring to FIG. 12, a first portion 211P1*d* may extend in the first direction DR1. A plurality of second portions 211P2*d* may protrude from the first portion 211P1*d*. The first portion 211P1*d* and the plurality of second portions 211P2*d* may be provided unitarily with each other. The first portion 211P1*d* and the plurality of second portions 211P2*d* may have their mesh structures.

The plurality of second portions 211P2*d* may include a plurality of first pattern portions 211PP1*d* and a plurality of second pattern portions 211PP2*d*.

Each of the plurality of first pattern portions 211PP1*d* may protrude from the first portion 211P1*d*. For example, each of the plurality of first pattern portions 211PP1*d* may protrude in the first cross direction DRa.

Each of the plurality of second pattern portions 211PP2*d* may protrude from the first portion 211P1*d*. For example, each of the plurality of second pattern portions 211PP2*d* may protrude in the second cross direction DRb.

Each of a plurality of cross patterns 212PTd may be spaced apart from each other across the first portion 211P1*d*. The plurality of cross patterns 212PTd may be symmetrical with each other about the first axis AX1.

The plurality of cross patterns 212PTd may include a first cross portion 212P1*d* and a plurality of second cross portions 212P2*d*.

The first cross portion 212P1*d* may extend in the second direction DR2. The plurality of second cross portions 212P2*d* may protrude from the first cross portion 212P1*d*. The first cross portion 212P1*d* and the plurality of second cross portions 212P2*d* may be provided unitarily with each other. The first cross portion 212P1*d* and the plurality of second cross portions 212P2*d* may have their mesh structures.

The plurality of second cross portions 212P2*d* may include a plurality of first cross pattern portions 212PP1*d* and a plurality of second cross pattern portions 212PP2*d*.

Each of the plurality of first cross pattern portions 212PP1*d* may protrude from the first cross portion 212P1*d*. For example, the plurality of first cross pattern portions 212PP1*d* may protrude in the first cross direction DRa. The plurality of first cross pattern portions 212PP1*d* may be correspondingly located adjacent to the plurality of first pattern portions 211PP1*d*.

The plurality of second cross pattern portions 212PP2*d* may protrude from the plurality of first cross portions 212P1*d*. For example, the plurality of second cross pattern portions 212PP2*d* may protrude in the second cross direction DRb. The plurality of second cross pattern portions 212PP2*d* may be correspondingly located adjacent to the plurality of second pattern parts 211PP2*d*.

Figure 13:
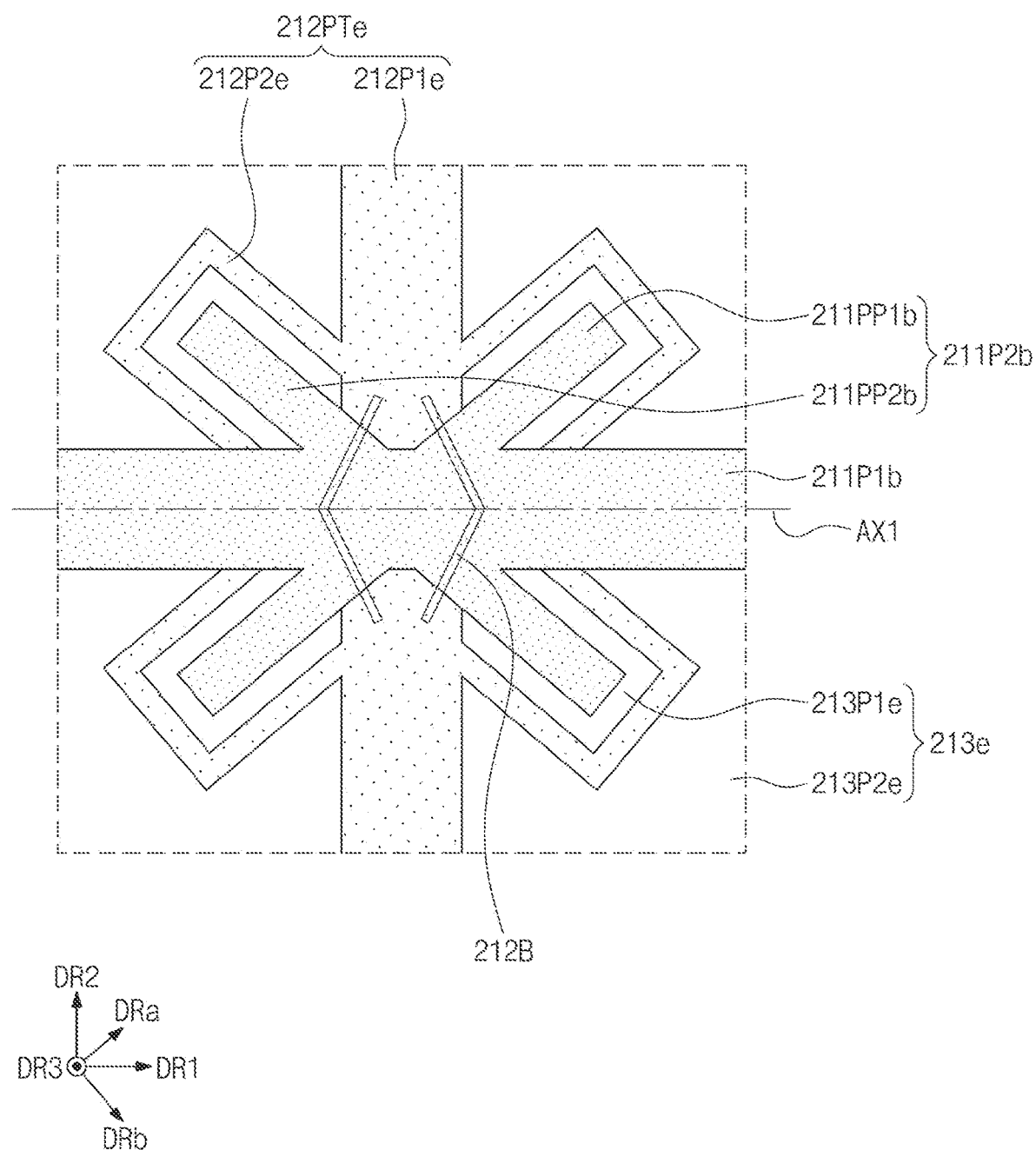

FIG. 13 illustrates a plan view showing one of a plurality of sub-sensing units according to some embodiments of the present invention. In explaining FIG. 13, the same reference symbols are allocated to the components discussed with reference to FIG. 8, and some repetitive description thereof may be omitted.

Referring to FIG. 13, a dummy electrode 213e may include a plurality of first dummy portions 213P1e and a plurality of second dummy portions 213P2e.

The plurality of first dummy portions 213P1e may correspondingly surround a plurality of first pattern portions 211PP1b and a plurality of second pattern portions 211PP2b. The plurality of first dummy portions 213P1e may be correspondingly located between a plurality of second cross portions 212P2e and a plurality of second portions 211P2b.

The plurality of second dummy portions 213P2e may be located adjacent to a first portion 211P1b, a first cross portion 212P1e, and the plurality of second cross portions 212P2e.

A plurality of cross patterns 212PTe may include the first cross portion 212P1e and the plurality of second cross portions 212P2e.

The first cross portion 212P1e may extend in the second direction DR2. The plurality of second cross portions 212P2e may protrude from the first cross portion 212P1e. The first cross portion 212P1e and the plurality of second cross portions 212P2e may be provided unitarily with each other. The first cross portion 212P1e and the plurality of second cross portions 212P2e may have their mesh structures. The plurality of second cross portions 212P2e may correspondingly surround the plurality of first dummy portions 213P1e.

Figure 14:
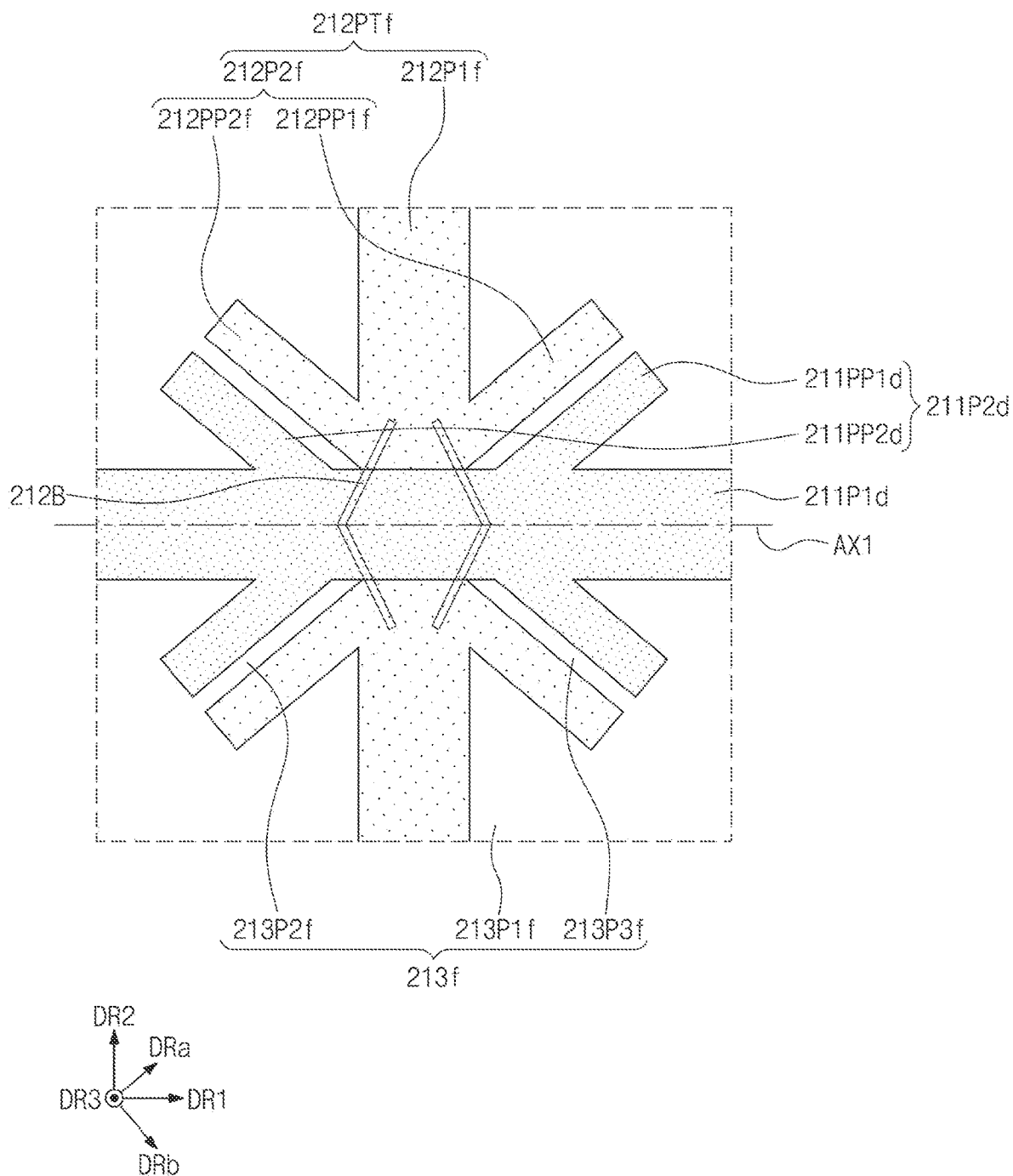

FIG. 14 illustrates a plan view showing one of a plurality of sub-sensing units according to some embodiments of the present invention. In explaining FIG. 14, the same reference symbols are allocated to the components discussed in FIG. 12, and some repetitive description thereof may be omitted.

Referring to FIG. 14, a dummy electrode 213f may include a plurality of first dummy portions 213P1f, a plurality of second dummy portions 213P2f, and a plurality of third dummy parts 213P3f.

The plurality of first dummy portions 213P1f may be correspondingly located between a plurality of first pattern portions 211PP1d and a plurality of first cross pattern portions 212PP1f.

The plurality of second dummy portions 213P2f may be correspondingly located between a plurality of second pattern portions 211PP2d and a plurality of second cross pattern portions 212PP2f.

The plurality of third dummy parts 213P3f may be located adjacent to a first portion 211P1d, a plurality of second portions 211P2d, and a plurality of cross patterns 212PTf.

The plurality of cross patterns 212PTf may include a first cross portion 212P1f and a plurality of second cross portions 212P2f.

The first cross portion 212P1f may extend in the second direction DR2. The plurality of second cross portions 212P2f may protrude from the first cross portion 212P1f. The first cross portion 212P1f and the plurality of second cross portions 212P2f may be provided unitarily with each other. The first cross portion 212P1f and the plurality of second cross portions 212P2f may have their mesh structures.

The plurality of second cross portions 212P2f may include a plurality of first cross pattern portions 212PP1f and a plurality of second cross pattern portions 212PP2f.

The plurality of first cross pattern portions 212PP1f may be correspondingly spaced apart from the plurality of first pattern portions 211PP1d across the plurality of first dummy portions 213P1f.

The plurality of second cross pattern portions 212PP2f may be correspondingly spaced apart from the plurality of second pattern portions 211PP2d across the plurality of second dummy portions 213P2f.

Figure 15:
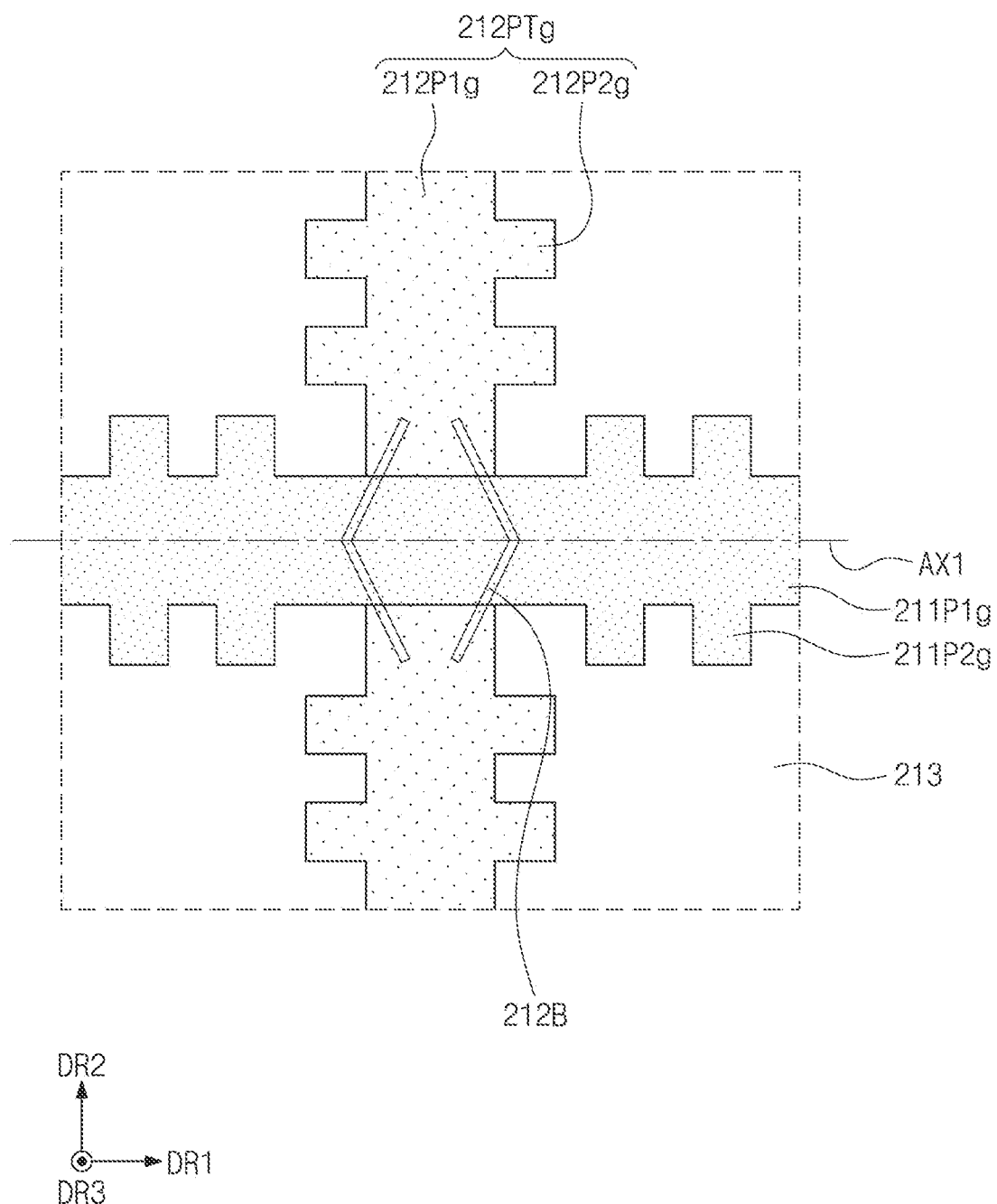

FIG. 15 illustrates a plan view showing one of a plurality of sub-sensing units according to some embodiments of the present invention. In explaining FIG. 15, the same reference symbols are allocated to the components discussed with reference to FIG. 5B, and some repetitive description thereof may be omitted.

Referring to FIG. 15, a first portion 211P1g may extend in the first direction DR1. A plurality of second portions 211P2g may protrude in the second direction DR2 from the first portion 211P1g. The plurality of second portions 211P2g may be spaced apart from each other in the first direction DR1.

The first portion 211P1g and the plurality of second portions 211P2g may be provided unitarily with each other. The first portion 211P1g and the plurality of second portions 211P2g may have their mesh structures.

A plurality of cross patterns 212PTg may be spaced apart from each other across the first portion 211P1g. The plurality of cross patterns 212PTg may be symmetrical with each other about the first axis AX1.

The plurality of cross patterns 212PTg may include a first cross portion 212P1g and a plurality of second cross portions 212P2g.

The first cross portion 212P1g may extend in the second direction DR2. The plurality of second cross portions 212P2g may protrude in the first direction DR1 from the first cross portion 212P1g. The plurality of second cross portions 212P2g may be spaced apart from each other in the second direction DR2.

The first cross portion 212P1g and the plurality of second cross portions 212P2g may be provided unitarily with each other. The first cross portion 212P1g and the plurality of second cross portions 212P2g may have their mesh structures.

Figure 16:
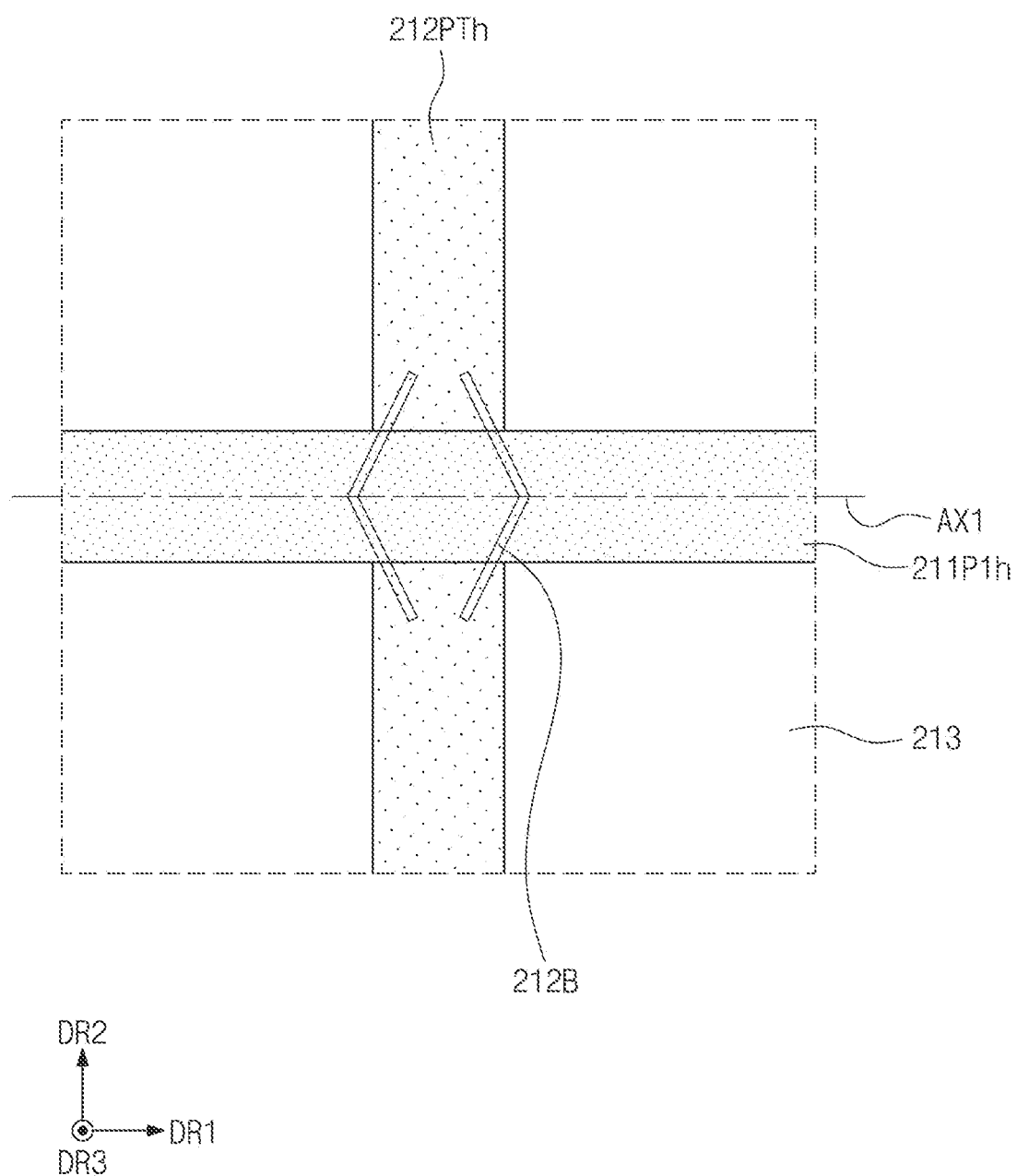

FIG. 16 illustrates a plan view showing one of a plurality of sub-sensing units according to some embodiments of the present invention. In explaining FIG. 16, the same reference symbols are allocated to the components discussed with reference to FIG. 5B, and some repetitive description thereof may be omitted.

Referring to FIG. 16, a first portion 211P1h may extend in the first direction DR1. The first portion 211P1h may have a mesh structure.

A plurality of cross patterns 212PTh may be spaced apart from each other across the first portion 211P1h. The plurality of cross patterns 212PTh may be symmetrical with each other about the first axis AX1. Each of the plurality of cross patterns 212PTh may extend in the second direction DR2. The plurality of cross patterns 212PTh may have a mesh structure.

Figure 17:
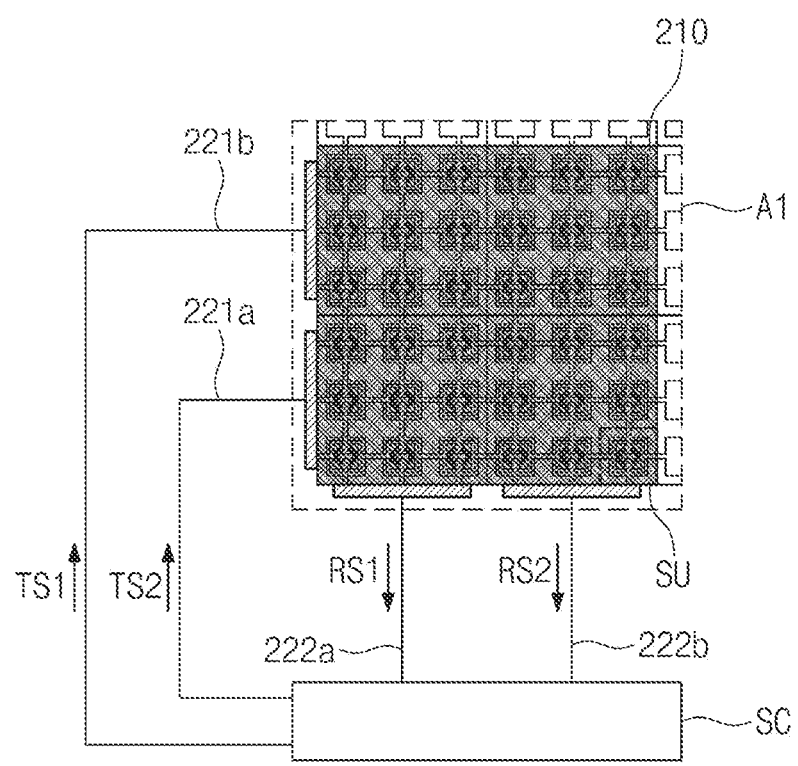
FIG. 17 illustrates a schematic diagram showing a sensor layer under a first mode according to some embodiments of the present invention.
Figure 18A:
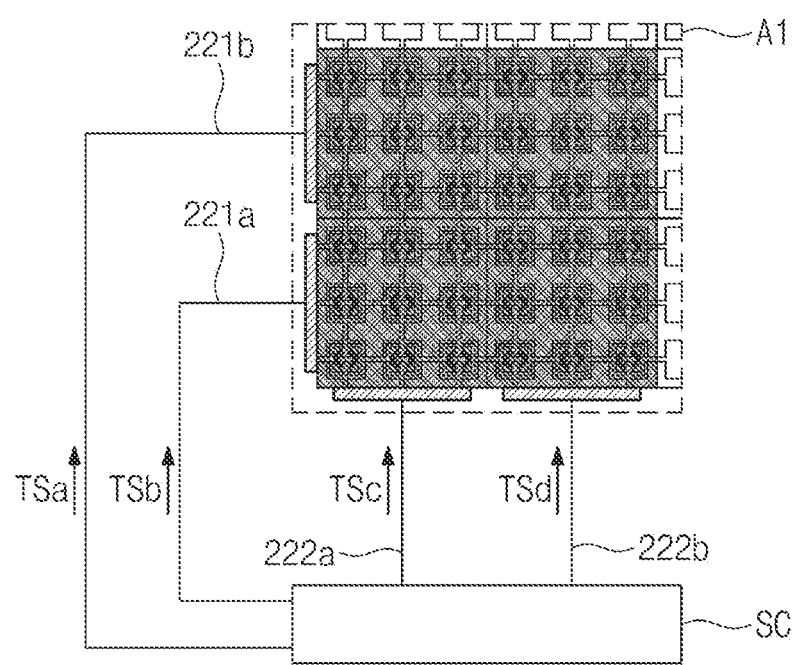
FIGS. 18A and 18B illustrate schematic diagrams showing a sensor layer under a second mode according to some embodiments of the present invention.
Figure 18B:
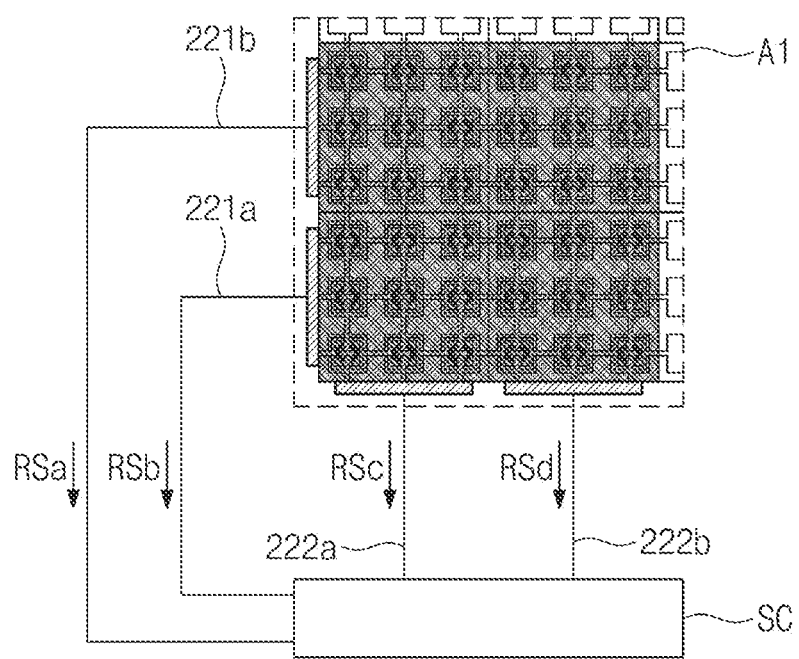

FIG. 17 illustrates a schematic diagram showing a sensor layer under a first mode according to some embodiments of the present invention. FIGS. 18A and 18B illustrate schematic diagrams showing a sensor layer under a second mode according to some embodiments of the present invention. FIG. 17 depicts by way of example four sensing units, but an operation of the present invention does not depend on the number of the sensing units.

Referring to FIGS. 4 to 5B and 17 to 18B, under a first mode, each of a plurality of electrodes 211 may serve as a transfer electrode, and each of a plurality of cross electrodes 212 may serve as a receiving electrode. This, however, is merely an example, and no limitation is imposed on the operations of the plurality of electrodes 211 and cross electrodes 212 according to some embodiments of the present invention. For example, under the first mode, each of the plurality of cross electrodes 212 may serve as a transfer electrode, and each of the plurality of electrodes 211 may serve as a receiving electrode. Under the first mode, a sensor controller SC may detect an external input by sensing a variation in mutual capacitance between the electrode 211 and the cross electrode 212.

A plurality of wiring lines 220 may include a plurality of first wiring lines 221a and 221b and a plurality of second wiring lines 222a and 222b, all of which are electrically connected to a plurality of sub-sensing units SU. For example, each of the plurality of wiring lines 220 may be connected to a plurality of sub-sensing units SU adjacent to the peripheral region 200N. For example, one wiring line 220 may be connected to three sub-sensing units SU.

According to the present invention, a single wiring line 220 may be connected to a plurality of sub-sensing units SU. It may not be necessary to increase the number of wiring lines required to provide the sensor layer 200 with signals. Therefore, because of no necessity of additional wiring lines, the peripheral region 200N may not be required to increase its area and a narrow bezel may be achieved.

A plurality of first wiring lines 221 may be electrically connected to a plurality of electrodes 211. A plurality of second wiring lines 222 may be electrically connected to a plurality of cross electrodes 212.

Under the first mode, the sensor controller SC may provide a plurality of electrodes 211 with driving signals TS1 and TS2. Under the first mode, the sensor controller SC may receive sensing signals RS1 and RS2 from a plurality of cross electrodes 212. Therefore, based on variations of the sensing signals RS1 and RS2, the sensor controller SC may generate coordinates of positions to which inputs are provided.

When the input device 2000 approaches the sensor layer 200, the sensor layer 200 may enter a second mode in which the input device 2000 is detected (see FIG. 2). The input device 2000 and the sensor controller SC may transceive data with each other through the sensor layer 200.

Under the second mode, a plurality of electrodes 211 and a plurality of cross electrodes 212 may serve as transfer electrodes that provide the input device 2000 with uplink signals TSa, TSb, TSc, and TSd received from the sensor controller SC. Under the second mode, a plurality of electrodes 211 and a plurality of cross electrodes 212 may serve as receiving electrodes that provide the sensor controller SC with downlink signals RSa, RSb, RSc, and RSd received from the input device 2000. For example, under the second mode, a plurality of electrodes 211 and a plurality of cross electrodes 212 may all be used as transfer electrodes or receiving electrodes.

The sensor layer 200 may include a plurality of sub-sensing units SU that are repeatedly arranged at the second pitch PC2 less than the second width (see, e.g., element WE2 of FIG. 2) of the pen electrode (see, e.g., element 2600 of FIG. 2) included in the input device 2000. The input region of the input device 2000 may have an area less than that of each of the plurality of sub-sensing units SU.

According to the present invention, when the input device 2000 is detected, the sub-sensing unit SU may be located within the coverage of the input region of the input device 2000 that overlaps the sensor layer 200. On one sensing unit 210, there may be a reduced deviation in capacitance between the sensor layer 200 and the input device 2000, which deviation depends on the position of the input device 2000. For example, when the input device 2000 is used to provide inputs in the form of lines such as characters or pictures, it may be possible to prevent a difference in capacitance measured from a single sensing unit 210. Therefore, the sensor layer 200 may increase in coordinate accuracy and detection reliability. As a result, the input may improve in linearity.

Figure 19:
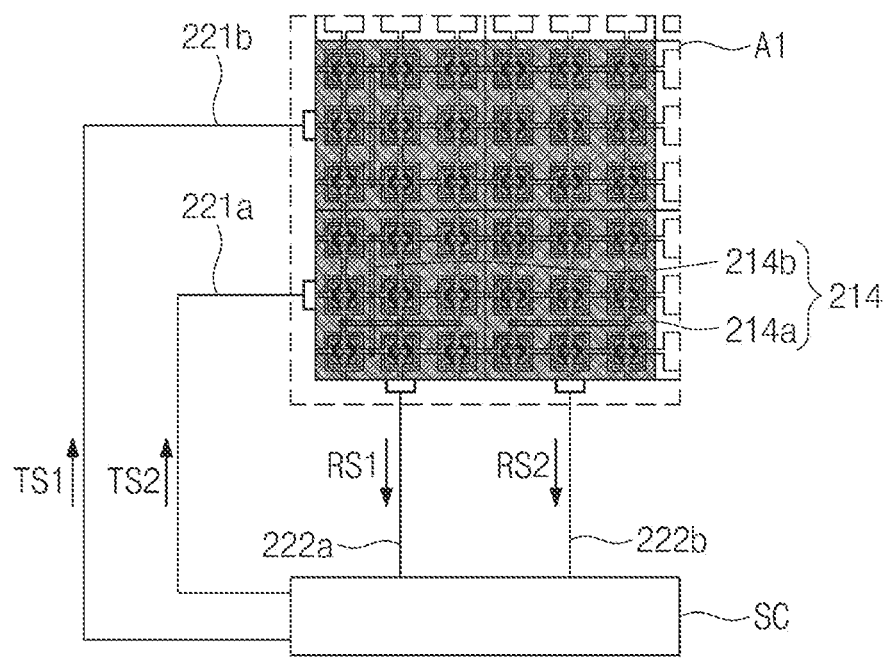
FIG. 19 illustrates a sensor layer under a first mode according to some embodiments of the present invention.

FIG. 19 illustrates a sensor layer under a first mode according to some embodiments of the present invention. In explaining FIG. 19, the same reference symbols are allocated to the components discussed with reference to FIG. 17, and some repetitive description thereof may be omitted.

Referring to FIGS. 4 to 5B and 19, each of a plurality of wiring lines 220 may be connected to one of a plurality of sub-sensing units SU adjacent to the peripheral region 200N.

Each of a plurality of sensing units 210 may further include a plurality of connection patterns 214 that connect the plurality of sub-sensing units SU to each other. The plurality of connection patterns 214 may be located on the active region 200A.

The plurality of connection patterns 214 may include a plurality of first connection patterns 214a and a plurality of second connection patterns 214b.

The plurality of first connection patterns 214a may electrically connect a plurality of first cross portions 212P1 to each other.

The plurality of second connection patterns 214b may electrically connect a plurality of first portions 211P1 to each other.

At least one of the plurality of first connection patterns 214a may be insulated from and intersect at least one of the plurality of second connection patterns 214b.

According to the present invention, the sensor layer 200 may be configured such a plurality of connection patterns 214 electrically connect a plurality of sub-sensing units SU to each other, and that the plurality of connection patterns 214 reduce each resistance of a plurality of electrodes 211 and a plurality of cross electrodes 212. The sensor layer 200 may easily transfer the driving signals TS1 and TS2 and the sensing signals RS1 and RS2. Therefore, it may be possible to improve signal transfer of the sensor layer 200

According to the present invention, a sensor layer may include a plurality of sensing units, and each of the plurality of sensing units may include a plurality of sub-sensing units. When an input device is detected, the sub-sensing unit may be located within the coverage of an input region of the input device that overlaps the sensor layer. On one sensing unit, there may be a reduced deviation in capacitance between the sensor layer and the input device, which deviation depends on the position of the input device. Therefore, the sensor layer may increase in coordinate accuracy for the input device. For example, when the input device is used to provide inputs in the form of lines such as characters or pictures, it may be possible to prevent a difference in capacitance measured from a single sensing unit, and as a result, the input may improve in linearity and the sensor layer may increase in detection reliability.

Although aspects of some embodiments have been described with reference to a number of illustrative examples thereof, it will be understood by those of ordinary skill in the art that various changes in form and details may be made without departing from the spirit and scope of the present inventive concept as set forth in the following claims and their equivalents. Thus, the technical scope of embodiments according to the present invention are not limited by the embodiments and examples described above, but by the following claims and their equivalents.

What is claimed is:

1. An electronic device, comprising:
a display layer; and
a sensor layer on the display layer and having an active region and a peripheral region adjacent to the active region, the sensor layer including a plurality of sensing units on the active region and a plurality of wiring lines on the peripheral region,
wherein each of the plurality of sensing units includes a plurality of sub-sensing units,
wherein each of the plurality of sub-sensing units includes:
a first portion of an electrode extending in a first direction;
a plurality of second portions of an electrode protruding from the first portion;
a plurality of cross patterns of a cross electrode spaced apart from each other across the first portion; and
a bridge pattern of a cross electrode insulated from the first portion and electrically connected to the plurality of cross patterns, the bridge pattern intersecting the first portion, and
wherein the plurality of wiring lines include a first wiring line that is individually electrically connected with each of the electrodes of the sub-sensing units of a single sensing unit of the plurality of sensing units and a second wiring line that is individually electrically connected with each of the cross electrodes of the sub-sensing units of the single sensing unit of the plurality of sensing units.

2. The electronic device of claim 1, wherein each of the plurality of cross patterns includes:
a first cross portion extending in a second direction intersecting the first direction; and
a plurality of second cross portions protruding from the first cross portion and adjoining the plurality of second portions.

3. The electronic device of claim 2, wherein the plurality of second portions include:
a plurality of first pattern portions protruding in the second direction from the first portion;
a plurality of second pattern portions that correspondingly protrude from the plurality of first pattern portions in a third direction at an angle between the first direction and the second direction; and
a plurality of third pattern portions that protrude in a first cross direction intersecting the first and second directions.

4. The electronic device of claim 3, wherein the plurality of second cross portions include:
a plurality of first cross pattern portions that correspondingly surround the plurality of first pattern portions and the plurality of second pattern portions; and
a plurality of second cross pattern portions that correspondingly protrude in a direction toward the plurality of third pattern portions.

5. The electronic device of claim 4, wherein each of the plurality of sub-sensing units further includes a plurality of dummy parts that are correspondingly located between the plurality of first pattern portions, the plurality of second pattern portions, the plurality of third pattern portions, and the plurality of second cross pattern portions.

6. The electronic device of claim 2, wherein the plurality of second cross portions include:
a plurality of first cross pattern portions protruding in the first direction from the first cross portion; and
a plurality of second cross pattern portions that correspondingly protrude from the plurality of first cross pattern portions in a third direction at an angle between the first direction and the second direction.

7. The electronic device of claim 6, wherein the plurality of second portions include:
a plurality of first pattern portions that correspondingly surround the plurality of first cross pattern portions and the plurality of second cross pattern portions; and
a plurality of second pattern portions that are correspondingly spaced apart from the plurality of first pattern portions across the plurality of first cross pattern portions and the plurality of second cross pattern portions.

8. The electronic device of claim 2, wherein the plurality of second portions include:
a plurality of first pattern portions protruding from the first portion in a first cross direction intersecting the first and second directions; and
a plurality of second pattern portions protruding from the first portion in a second cross direction intersecting the first cross direction.

9. The electronic device of claim 8, wherein the plurality of second cross portions surround the plurality of second portions.

10. The electronic device of claim 9, wherein the plurality of sub-sensing units further include a plurality of dummy parts that are correspondingly located between the plurality of second cross portions and the plurality of second portions.

11. The electronic device of claim 8, wherein the plurality of second cross portions include:
a plurality of first cross pattern portions that adjoin the plurality of first pattern portions and protrude in the first cross direction from the first cross portion; and
a plurality of second cross pattern portions that adjoin the plurality of second pattern portions and protrude in the second cross direction from the first cross portion.

12. The electronic device of claim 11, wherein each of the plurality of sub-sensing units includes:
a plurality of first dummy portions that are correspondingly located between the plurality of first pattern portions and the plurality of first cross pattern portions; and
a plurality of second dummy portions that are correspondingly located between the plurality of second pattern portions and the plurality of second cross pattern portions.

13. The electronic device of claim 2, wherein
the plurality of second portions protrude in the second direction from the first portion, and
the plurality of second cross portions protrude in the first direction from the first cross portion.

14. The electronic device of claim 1, wherein each of the plurality of sensing units has a first region, a plurality of second regions adjacent in the first direction to the first region, and a plurality of third regions adjacent in a second direction to the first region, the second direction intersecting the first direction,
wherein the first portion, the plurality of second portions, the plurality of cross patterns, and the bridge pattern are within the first region,
wherein the first portion and the plurality of second portions are within one or more of the plurality of second regions, and wherein the plurality of cross patterns are within one or more of the plurality of third regions.

15. The electronic device of claim 2, wherein each of the plurality of sub-sensing units further includes a dummy electrode, wherein each of the plurality of sub-sensing units has a first region and a second region that surrounds the first region, wherein the first region is provided with the first portion, the plurality of second portions, the plurality of cross patterns, the bridge pattern, and the dummy electrode, and wherein the second region is provided with the first portion, the first cross portion, and the dummy electrode.

16. The electronic device of claim 1, wherein each of the plurality of wiring lines is connected to the sub-sensing units adjacent to the peripheral region.

17. An electronic device, comprising:
a display layer; and
a sensor layer on the display layer and having an active region and a peripheral region adjacent to the active region, the sensor layer including a first electrode and a second electrode that extend in a first direction, a third electrode that extends in a second direction intersecting the first direction, and a plurality of wiring lines,
wherein the first electrode, the second electrode, and the third electrode are on the active region,
wherein the plurality of wiring lines are on the peripheral region,
wherein the first electrode includes:
a first electrode portion extending in the first direction; and
a plurality of first protrusions that protrude from the first electrode portion,
wherein the second electrode includes:
a second electrode portion extending in the first direction; and
a plurality of second protrusions protruding from the second electrode portion,
wherein the third electrode includes:
a third electrode portion extending in the second direction; and
a plurality of third protrusions that correspondingly surround the plurality of first protrusions and the plurality of second protrusions, and
wherein the plurality of wiring lines include:
a first wiring line that is individually electrically connected with each of electrodes of sub-sensing units of a single sensing unit of a plurality of sensing units and electrically connected to the first electrode and the second electrode; and
a second wiring line that is individually electrically connected with each of third electrodes of the sub-sensing units of the single sensing unit of the plurality of sensing units.

* * * * *